(12) United States Patent
Hallale et al.

(10) Patent No.: US 11,324,166 B2
(45) Date of Patent: May 10, 2022

(54) HARVESTER ROW HEAD

(71) Applicant: DEERE & COMPANY, Moline, IL (US)

(72) Inventors: Sanjeev Hallale, Pune (IN); Mohamad S. El-Zein, Bettendorf, IA (US); Hema V. Guthy, Moline, IL (US); Sankaran Subramaniam, Bettendorf, IA (US); Hector Portillo, Monterrey (MX); Nathan E. Krehbiel, Bettendorf, IA (US); Eric D. Windsor, Prophetstown, IL (US); Nathan F. Tortorella, Bettendorf, IA (US); Daniel J. Cox, Davenport, IA (US); Daniel A. Hartschuh, Bettendorf, IA (US); Christopher J. McKelvey, Davenport, IA (US); Amol M. Sawale, Pune (IN); Ryan M. Gneiting, Bettendorf, IA (US)

(73) Assignee: Deere & Company, Moline, IL (US)

(*) Notice: Subject to any disclaimer, the term of this patent is extended or adjusted under 35 U.S.C. 154(b) by 310 days.

(21) Appl. No.: 16/654,088

(22) Filed: Oct. 16, 2019

(65) Prior Publication Data
US 2021/0112720 A1 Apr. 22, 2021

(51) Int. Cl.
A01D 45/02 (2006.01)
(52) U.S. Cl.
CPC .................. A01D 45/025 (2013.01)
(58) Field of Classification Search
CPC .... A01D 45/025; A01D 67/00; A01D 45/021; A01D 41/06; A01D 45/02
See application file for complete search history.

(56) References Cited

U.S. PATENT DOCUMENTS

| | | | | |
|---|---|---|---|---|
| 5,174,101 A | * | 12/1992 | Rabitsch | A01D 41/14 56/119 |
| 6,226,969 B1 | * | 5/2001 | Becker | A01D 45/021 56/62 |
| D454,576 S | * | 3/2002 | Huntimer | D15/28 |
| 7,373,769 B2 | * | 5/2008 | Talbot | A01D 34/14 56/296 |
| 7,469,524 B2 | | 12/2008 | Rieck et al. | |
| 7,913,480 B2 | * | 3/2011 | Christensen | A01D 45/021 56/62 |
| 8,756,904 B2 | | 6/2014 | Schrattenecker | |
| 9,179,602 B2 | * | 11/2015 | Vandeven | A01D 45/021 |
| 9,386,747 B2 | | 7/2016 | Madheswaran et al. | |

(Continued)

FOREIGN PATENT DOCUMENTS

CN 202455863 U 10/2012

Primary Examiner — Arpad Fabian-Kovacs

(57) ABSTRACT

Frame assemblies for a corn row head formed from components formed from different materials may include a frame portion having a first beam leg and a second beam leg formed of a first material and a skid plate attached to each of the first beam leg and the second beam leg formed from a second material different than the first material. The first material may be aluminum, and the second material may be steel. In some implementations, a breast plate joining the first beam leg and the second beam leg may be formed from the first material and may be welded to the first beam leg and the second beam leg. In other implementations, the breast plate may be formed from the second material and may be adhesively bonded to the first and second beam legs.

18 Claims, 23 Drawing Sheets

(56) References Cited

U.S. PATENT DOCUMENTS

| | | | |
|---|---|---|---|
| 9,668,413 B2* | 6/2017 | Walker | A01D 45/021 |
| 10,058,027 B2* | 8/2018 | Gessel | A01D 34/015 |
| 2009/0025353 A1* | 1/2009 | Christensen | A01D 45/025 |
| | | | 56/94 |
| 2009/0266044 A1* | 10/2009 | Goers | A01D 57/20 |
| | | | 56/208 |
| 2011/0011048 A1* | 1/2011 | Hoffman | A01D 45/023 |
| | | | 56/119 |
| 2011/0173942 A1* | 7/2011 | Kowalchuk | A01D 45/021 |
| | | | 56/62 |
| 2012/0047865 A1* | 3/2012 | Lohrentz | A01D 45/021 |
| | | | 56/113 |
| 2014/0150394 A1* | 6/2014 | Calmer | A01D 45/021 |
| | | | 56/106 |
| 2015/0257337 A1 | 9/2015 | Schrattenecker | |
| 2018/0139902 A1* | 5/2018 | Walker | A01D 45/021 |
| 2018/0199510 A1* | 7/2018 | Ehle | A01D 57/22 |
| 2020/0113135 A1* | 4/2020 | Modak | A01D 41/14 |

\* cited by examiner

HARVESTER ROW HEAD

FIELD OF THE DISCLOSURE

The present disclosure relates generally to row head and, more particularly, to combine harvester corn row heads.

BACKGROUND OF THE DISCLOSURE

Agricultural harvesters use corn row heads for separating ears of corn from plant stalks. Row heads are mounted to a harvester vehicle portion of an agricultural harvester.

SUMMARY OF THE DISCLOSURE

A first aspect of the present disclosure is directed to a corn row head. The corn row head may include a stalk roll assembly. The stalk roll assembly may include a frame portion. The frame portion may include a first beam leg including a first end and a second end and formed of a first material; a second beam leg including a first end and a second end and formed from the first material; a breast plate coupled to the second ends of the first beam leg and the second beam leg; a first skid plate coupled to the first end of the first beam leg; and a second skid plate coupled to the first end of the second beam leg, the first skid plate and the second skid plate formed of a second material different than the first material.

A second aspect of the disclosure is directed to a stalk roll assembly for a corn row head. The stalk roll assembly may include a frame portion, and the frame portion may include a first beam leg formed of a first material; a second beam leg formed of the first material; a first skid plate formed of a second material adhesively attached to a first end of the first beam leg; and a second skid plate formed of the second material adhesively attached to a first end of the second beam leg.

A third aspect is directed to a method of manufacturing a frame portion for a stalk roll assembly of a corn row head. The method may include forming a first beam leg from a first material, the first beam leg comprising a first end and a second end; forming a second beam leg from a second material, the second beam leg comprising a first end and a second end; coupling the first beam leg and the second beam leg; forming a first skid plate from a second material different than the first material; and attaching, with an adhesive, a skid plate to the first end of one of the first beam leg or the second beam leg.

The various aspects may include one or more of the following features. The first material may have a density that is less than a density of the second material. The first material may be aluminum, and the second material may be steel. The first skid plate and the second skid plate may be coupled to the first beam leg and the second beam leg, respectively, with an adhesive. The first beam leg may include a first portion and a second portion, and the first portion and the second portion may be coupled together with a stiffener formed from the second material. The breast plate may include the second material, and the breast plate may be attached to the first beam leg and the second beam leg with an adhesive. The first beam leg may include a laterally-extending portion formed at the second end of the first beam leg, and the laterally extending portion may overlap a central portion of the breast plate. A doubler plate may overlay a portion of the first beam leg at the second end of the first beam leg such that the doubler plate, the breast plate, and the first beam leg form a three-layered structure. The breast plate may be formed from the second material. The breast plate may include a base portion and a side portion angularly extending from the base portion. The first beam leg may include a first side portion and a second side portion. The first side portion and the second side portion of the first beam leg may define an angle. The breast plate may overlay the first beam leg such that the side portion of the breast plate overlays an exterior surface of the first side portion of the first beam leg, and the base portion of the breast plate may overlay an exterior surface of the second side portion of the first beam leg. A doubler plate may overlay the side portion of the breast plate such that the side portion of the breast plate, the first side portion of the first beam leg, and the doubler plate forms a three-layered structure. The doubler plate may be attached to the side portion of the breast plate with an adhesive, and the side portion of the breast plate may be attached to the first side portion of the first beam leg with the adhesive. The breast plate may be formed from the first material, and the first beam leg and the second beam leg may be welded to the breast plate.

The various aspect of the present disclosure may also include one or more of the following features. The first beam leg may include a first casting, and the first casting may form an I-beam cross-section at a first end. The I-beam cross-section may include a first flange, a second flange, and a web formed between the first flange and the second flange. The second beam leg may include a second casting, and the second casting may form an I-beam cross-section at a first end. The I-beam cross-section may include a first flange, a second flange, and a web formed between the first flange and the second flange. The first skid plate may be attached to the first flange of the first casting, and the second skid plate may be attached to the first flange of the second casting. The first skid plate and the second skid plate may be attached to the first beam leg and the second beam leg, respectively, with one or more fasteners.

The various aspects may also include one or more of the following features. A breast plate may be formed from the first material. The breast plate may be attached to the second ends of the first beam leg and the second beam leg. Attaching the breast plate to the second ends of the first beam leg and the second beam leg may include welding the breast plate to the second ends of the first beam leg and the second beam leg. A breast plate may be formed from the second material, and the breast plate may be attached to the second ends of the first beam leg and the second beam leg with an adhesive.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description and accompanying drawings.

BRIEF DESCRIPTION OF THE DRAWINGS

The detailed description of the drawings refers to the accompanying figures in which.

DETAILED DESCRIPTION

Figure 1:
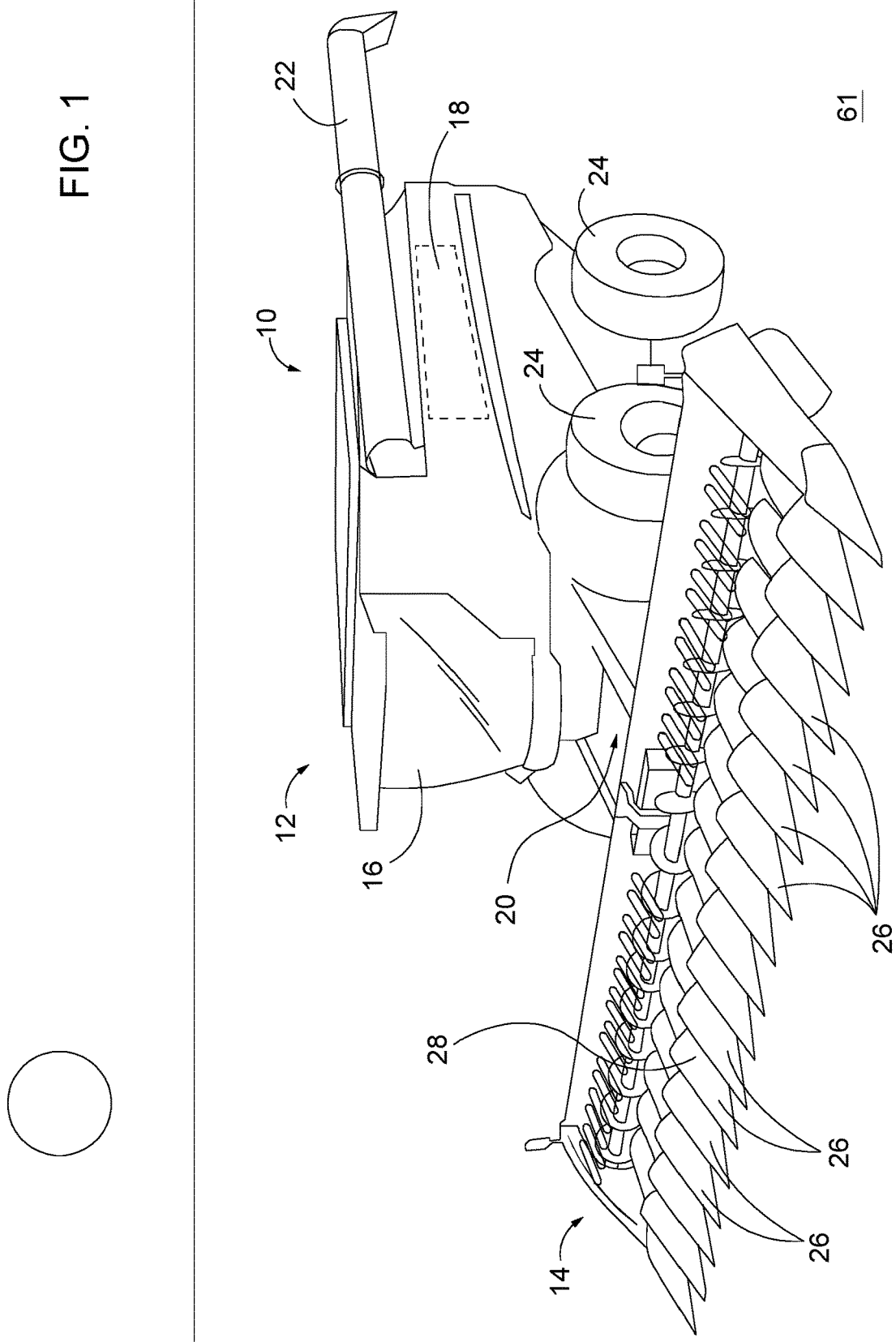
FIG. 1 is a perspective view of a corn harvester having a corn row head, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to a corn row head for a harvester that has a reduced mass. The mass of the corn row head is reduced, for example, by forming one or more components of the corn row head, such as a frame portion of the stalk roll assemblies, from a material having a density that is less than a material conventionally used to form the one or more components of the corn row head. By reducing the mass of the corn row head, a size of the corn row head may be increased. For example, the number of stalk roll assemblies included in the corn row head may be increased. By increasing the number of stalk roll assemblies present in a corn row head, a number of rows harvested in a single pass of the combine harvester is increased. Consequently, the number of passes of the combine harvester to harvest crops in a particular area is reduced. Consequently, an amount of time and energy used to harvest the crops in a given area may be correspondingly reduced.

FIG. 1 is a perspective view of an example corn combine harvester 10. The corn combine harvester 10 includes a work vehicle 12 and a corn row head 14. The work vehicle 12 includes an operator cab 16, an engine 18, a hopper 20, a dispensing chute 22, and a plurality of wheels 24. In other implementations, the work vehicle 12 may include one or more tracks in place of the one or more of the wheels 24. The corn row head 14 includes a plurality of crop dividers 26 and a cross auger 28.

Figure 2:
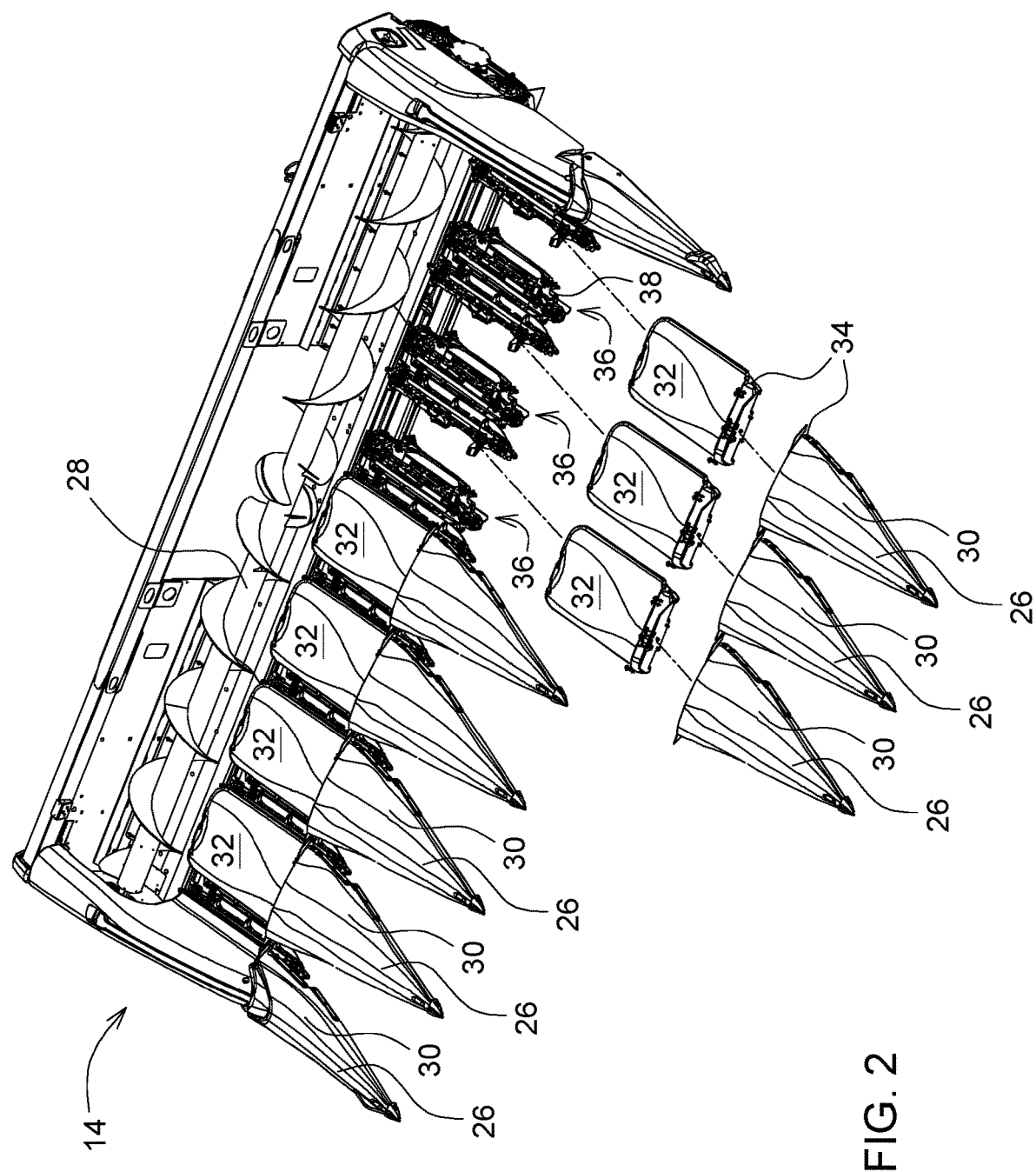
FIG. 2 is a partially exploded view of an example corn row head of FIG. 1.

FIG. 2 is a partially exploded view of the corn row head 14. As shown, each of the crop dividers 26 includes a first cover portion 30 and a second cover portion 32 positioned proximal to the first cover portion 30. The first cover portion 30 and the second cover portion 32 may have a hinged connection 34. The crop dividers 26 are located between laterally adjacent stalk roll assemblies 36. The crop dividers 26 direct corn stalks towards one of the stalk roll assemblies 36. As shown in FIG. 2, some crop dividers 26 are shown removed from associated stalk roll assemblies 36.

Figure 3:
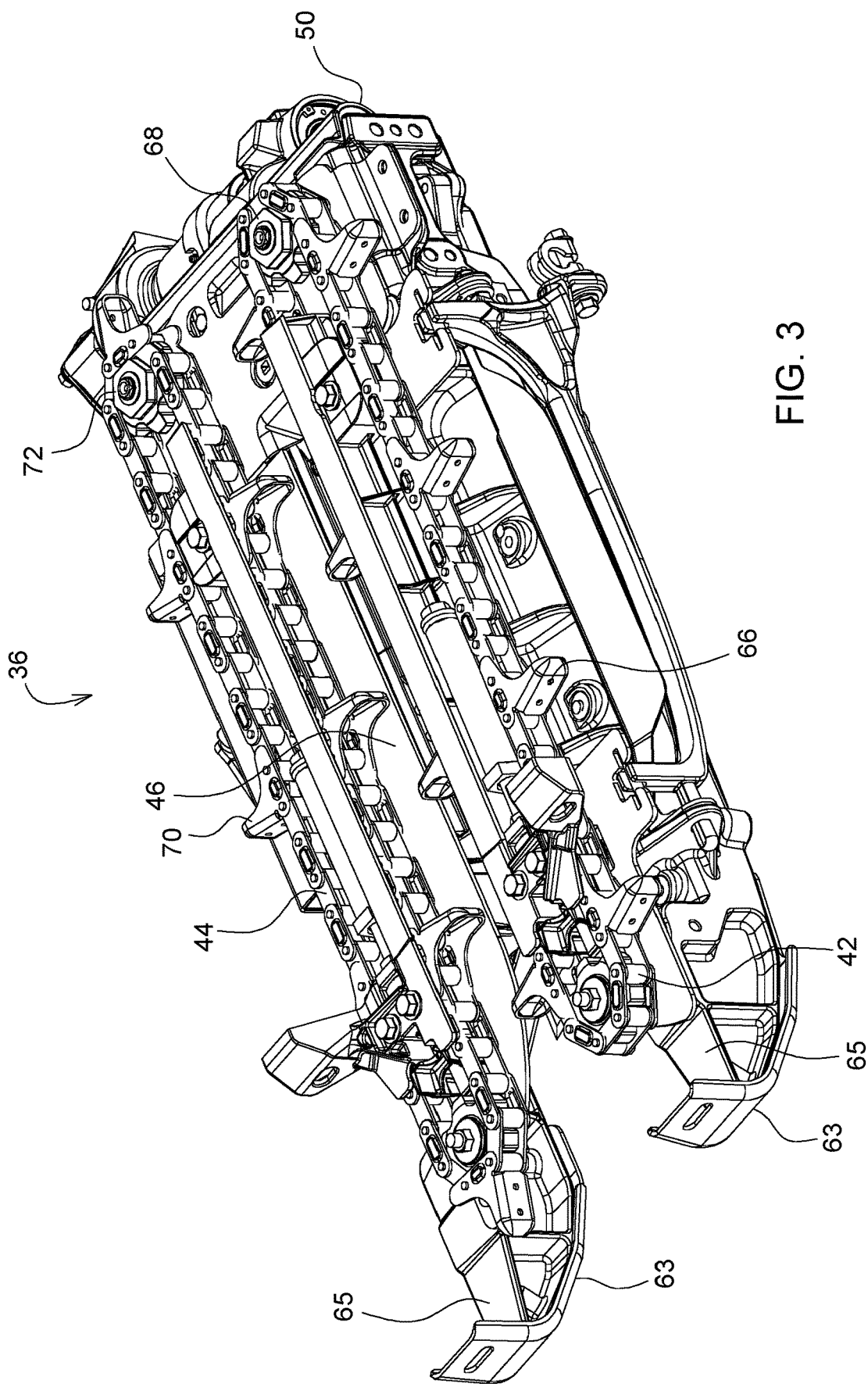
FIG. 3 is a perspective view of an example stalk roll assembly, according to some implementations of the present disclosure.
Figure 4:
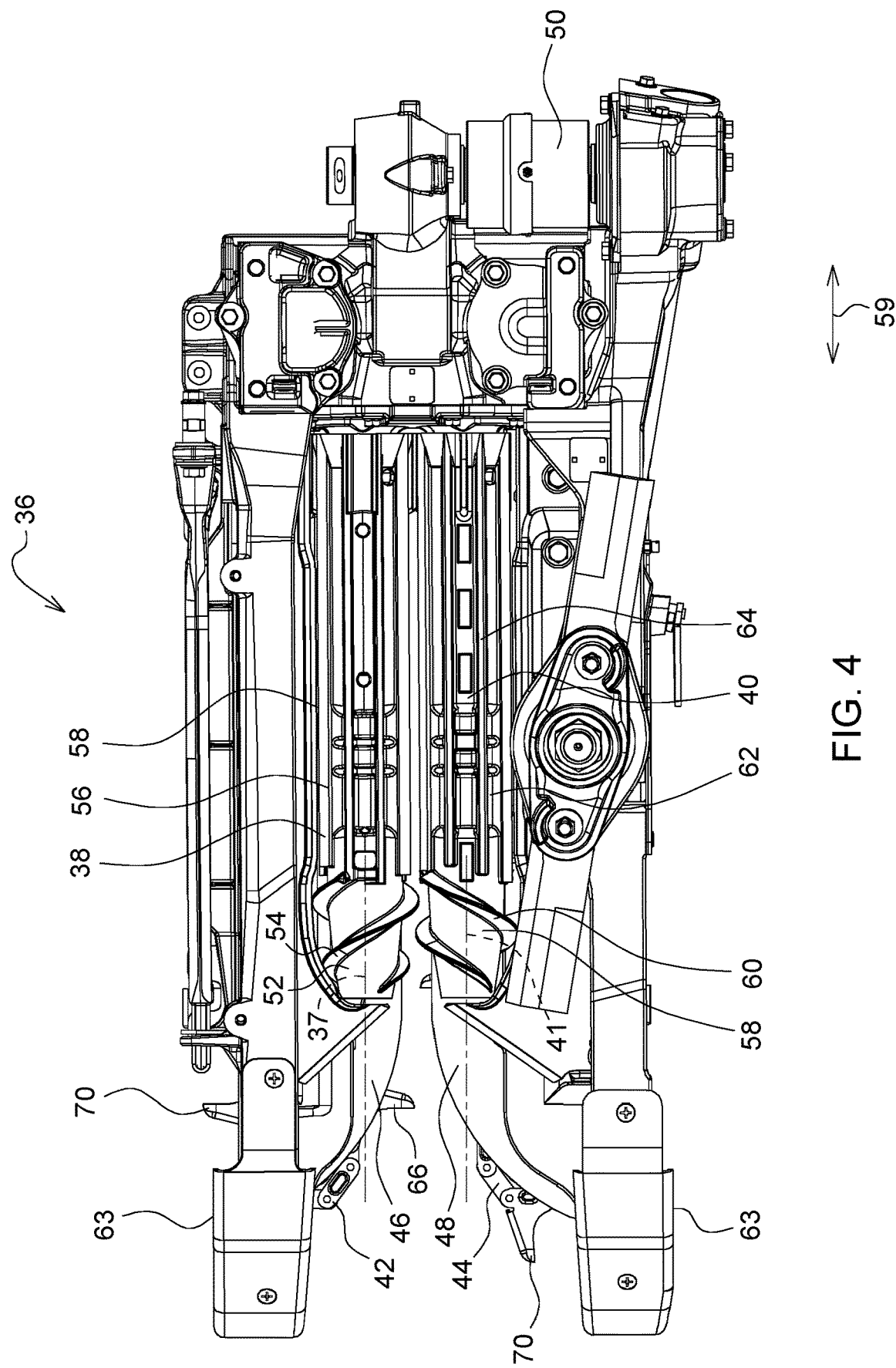
FIG. 4 is a bottom view of an example stalk roll assembly, according to some implementations of the present disclosure.

FIG. 3 is a perspective view of one of the stalk roll assemblies 36, and FIG. 4 is a bottom view of one of the stalk roll assemblies 36. The stalk roll assembly 36 includes a first stalk roll 38, a second stalk roll 40, a first gathering chain 42, a second gathering chain 44, a first plate 46, a second plate 48, and a power source 50. The first stalk roll 38 includes a frustoconical tip 52 having a helical blade 54 and a cylindrical portion 56 having a plurality of first blades 58. The plurality of first blades 58 are arranged radially on the cylindrical portion 56 and extend longitudinally along the cylindrical portion 56 in an axial direction indicated by double-sided arrow 59. Similarly, the second stalk roll 40 includes a frustoconical tip 58 having a helical blade 60 and a cylindrical portion 62 having a plurality of second blades 64. The plurality of second blades 64 are arranged radially on the cylindrical portion 56 and extend longitudinally along the cylindrical portion 56 in the axial direction indicated by the double-sided arrow 59. The first and second stalk rolls 38 and 40 rotate about longitudinal axes 37 and 41, respectively. In some implementations, during operation, the first and second stalk rolls 38 and 40 rotate such that a corn stalk disposed between the first and second stalk rolls 38 and 40 is displaced towards the earth 61, as shown in FIG. 1. Skid plates 63 are disposed at a first end 65 of each of the stalk roll assemblies 36. Each stalk roll assembly 36 includes a frame portion, such as frame portion 76 or frame portion 1400, described in more detail below.

The first gathering chain 42 includes a plurality of lugs 66 and is moveable in response to rotation of a drive sprocket 68. The power source 50 is operable to cause rotation of the drive sprocket 68 and, thus, movement of the lugs 66. The second gathering chain 44 includes a plurality of lugs 70 and is moveable in response to rotation of a drive sprocket 72. The power source 50 is operable to cause rotation of the drive sprocket 72 and, thus, movement of the lugs 70.

Figure 5:
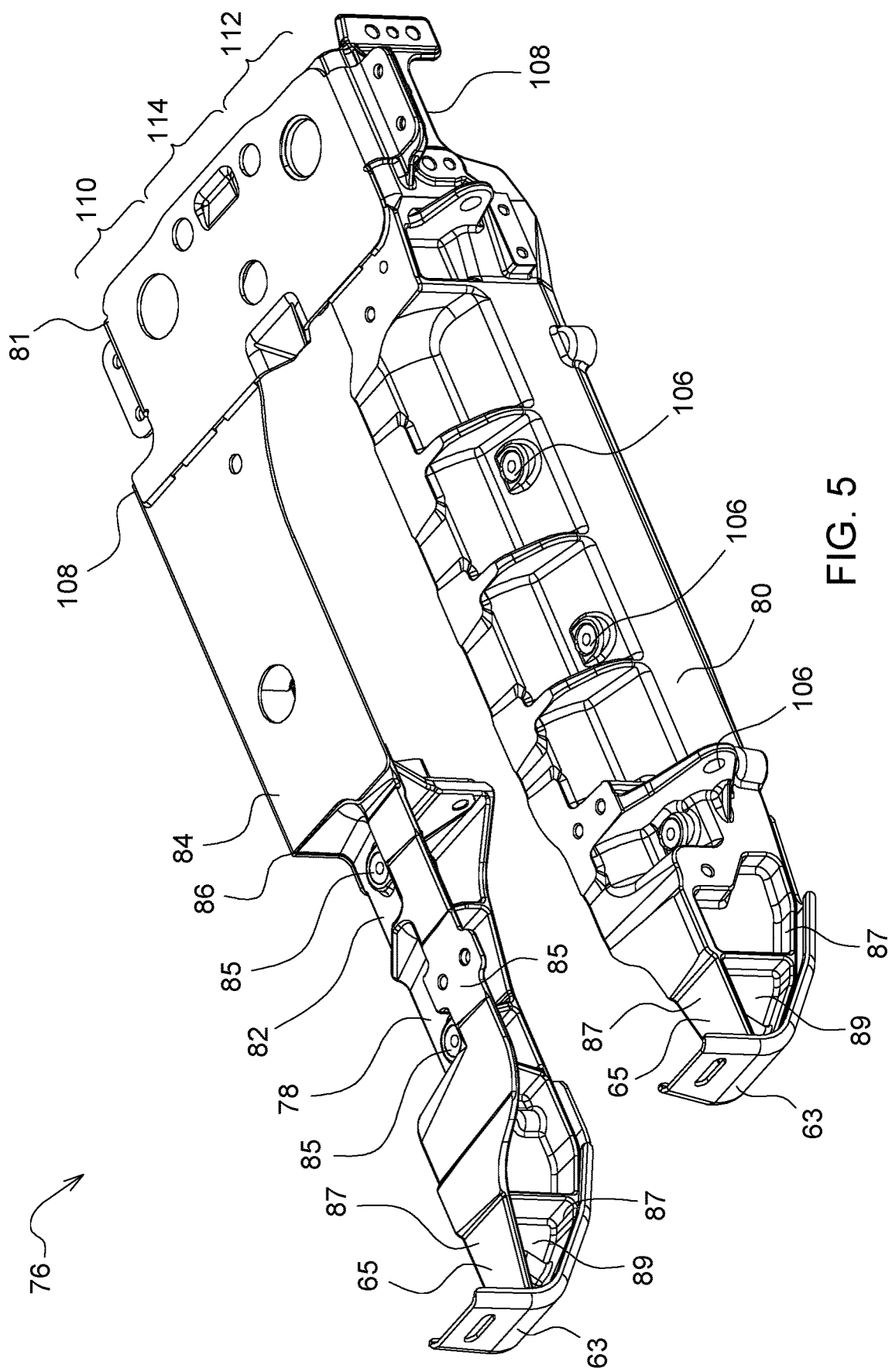
FIG. 5 is an example configuration of a frame portion of a frame assembly of a corn row head, according to some implementations of the present disclosure.

Also referring to FIG. 2, the corn row head 14 also includes a frame assembly 74. The frame assembly 74 is an assembly of the individual frame portions of the stalk roll assemblies 36. The frame portions of the stalk roll assemblies 36 may have different configurations. FIG. 5 shows a frame portion 76 of the stalk roll assembly 36 according to a first configuration.

As shown, the frame portion 76 includes a first beam leg 78 and a second beam leg 80 coupled to a breast plate 81. In some implementations, each of the first beam leg 78, the second beam leg 80, and the breast plate 81 is formed from a first material. In some implementations, the first material may be, for example, aluminum or an aluminum alloy (collectively referred to hereinafter as "aluminum") or titanium or a titanium alloy (collectively referred to hereinafter as "titanium"). Thus, in some implementations, the first beam leg 78, the second beam leg 80, and the breast plate 81 may be formed from aluminum. For example, in some implementations, 5052-H32 or 5052-H34 aluminum alloys may be used. In other implementations, other aluminum alloys may be used.

The first beam leg 78 includes a first portion 82 and a second portion 84. In some implementations, the first portion 82 is in the form of a casting formed from the first material. The second portion 84 is a stamping formed from the first material. Thus, in some implementations, the second portion 84 may be formed from a sheet or a plate formed of the first material. In some implementations, a thickness of the material forming the second portion 84 of the first beam leg 78 may be, for example, 2.0 millimeters (mm) (0.08 inches (in.)), 2.5 mm (0.10 in.), 3.0 mm (0.12 in.), 3.5 mm (0.14 in.), 4.0 mm (0.16 in.), or 4.5 mm (0.18 in.). In other implementations, the thickness of the material forming the second portion 84 of the first beam leg 78 may be less than 2.0 mm or greater than 4.5 mm.

As shown in FIG. 5, the first portion 82 of the first beam leg 78 includes integrated mounting locations 85 adapted to connect one or more other components to the first beam leg 78. In some implementations, the mounting locations 85 are formed into the first portion 82 of the first beam leg 78 during casting thereof or are machined into the first portion 82 of the first beam leg 78 after formation or both. Integrally forming the mounting locations 85 into the first portion 82 of the first beam leg 78 avoids the use of separate brackets to be attached to the first beam leg 78 for use in coupling the other components thereto. Further, by integrally forming the mounting locations 85 into the first portion 82, a total mass of the first beam leg 78 is reduced, and the total part count of the frame portion 76 is also reduced. As a result, complexity of the frame portion 76 is reduced, and the cost of the frame portion 76 is reduced. Consequently, the overall cost and complexity of the corn row head 14 and corn harvester 10 are also reduced. In the illustrated example, first ends 65 of the first portion 82 of the first beam leg 78 and the second beam leg 80 have a general I-beam construction that includes flanges 87 connected by a web 89. As shown, the flanges 87 combine to form a continuous structure.

One of the skid plates 63 is coupled to the first end 65 of the first beam leg 78 along one of the flanges 87. The skid plate 63 is formed from a second material, different from the first material, and is coupled to the first portion 82 of the first beam leg 78 by, for example, an adhesive, a fastener, or both. In some implementations, the first material has a density that is less than a density of the second material. As explained above, the first material may be aluminum or titanium. In some implementations, the second material may be steel or iron (such as a cast iron) or an alloy thereof. For example, the second material may be a steel having a yield strength of 690 megapascals (MPa). Thus, in some implementations, the skid plates 63 are formed from steel and may be in the form of a stamping formed from steel sheet or plate. The skid plates 63 may be formed from the steel or iron due to wear experienced by the skid plates 63 during operation, such as by sliding contact between the skid plates 63 and the ground 61.

Figure 6:
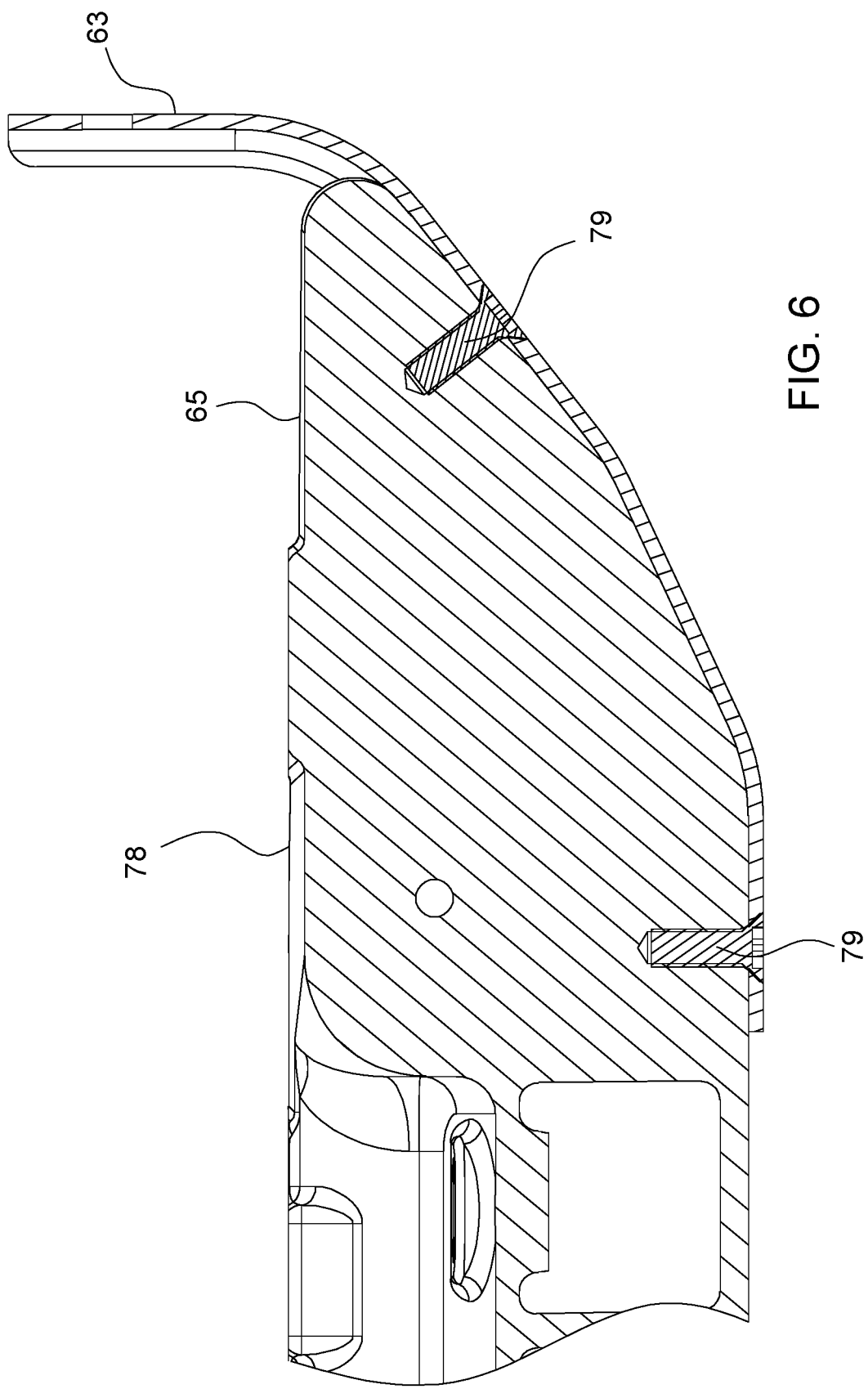
FIG. 6 is a detail cross-sectional view of an end of a beam leg of the frame portion of FIG. 5, according to some implementations of the present disclosure.

FIG. 6 is a cross sectional view of an example implementation of the first end 65 of the first beam leg 78. The view of FIG. 6 is taken along a plane passing through the web 89 of the first end 65. FIG. 6 shows the skid plate 63 attached to the first beam leg 78 with an adhesive and fasteners 79. Although two fasteners 79 are illustrated, additional or fewer fasteners 79 may be used to couple the skid plate 63 to the first beam leg 78 or the second beam leg 80. Still further, in some implementations, the fasteners 79 may be omitted, and the skid plate 63 may be coupled to the first beam leg 78 or the second beam leg 80 using an adhesive. Example adhesives include, but are not limited to methyl methacrylate, urethane, and epoxy adhesives. For example, in some implementations, Plexus® MA422, produced by ITW Performance Polymers of 30 Endicott Street, Danvers, Mass. 01923, may be used.

In some implementations, one or more fasteners 79 may be used to hold the skid plate 63 in position relative to the first and second beam legs 78 and 80. For example, the one or more fasteners 79 may be used to secure the skid plates 63 to the first and second beam legs 78 and 80 during a period of time to allow an adhesive used to bond the skid plate 63 to the flange 87 of the first ends 65 of the first and second beam legs 78 and 80 to cure. However, in other implementations, the one or more fasteners 79 may be omitted, and the skid plates 63 may be coupled to the first and second beam legs 78 and 80 solely by an adhesive.

Figure 7:
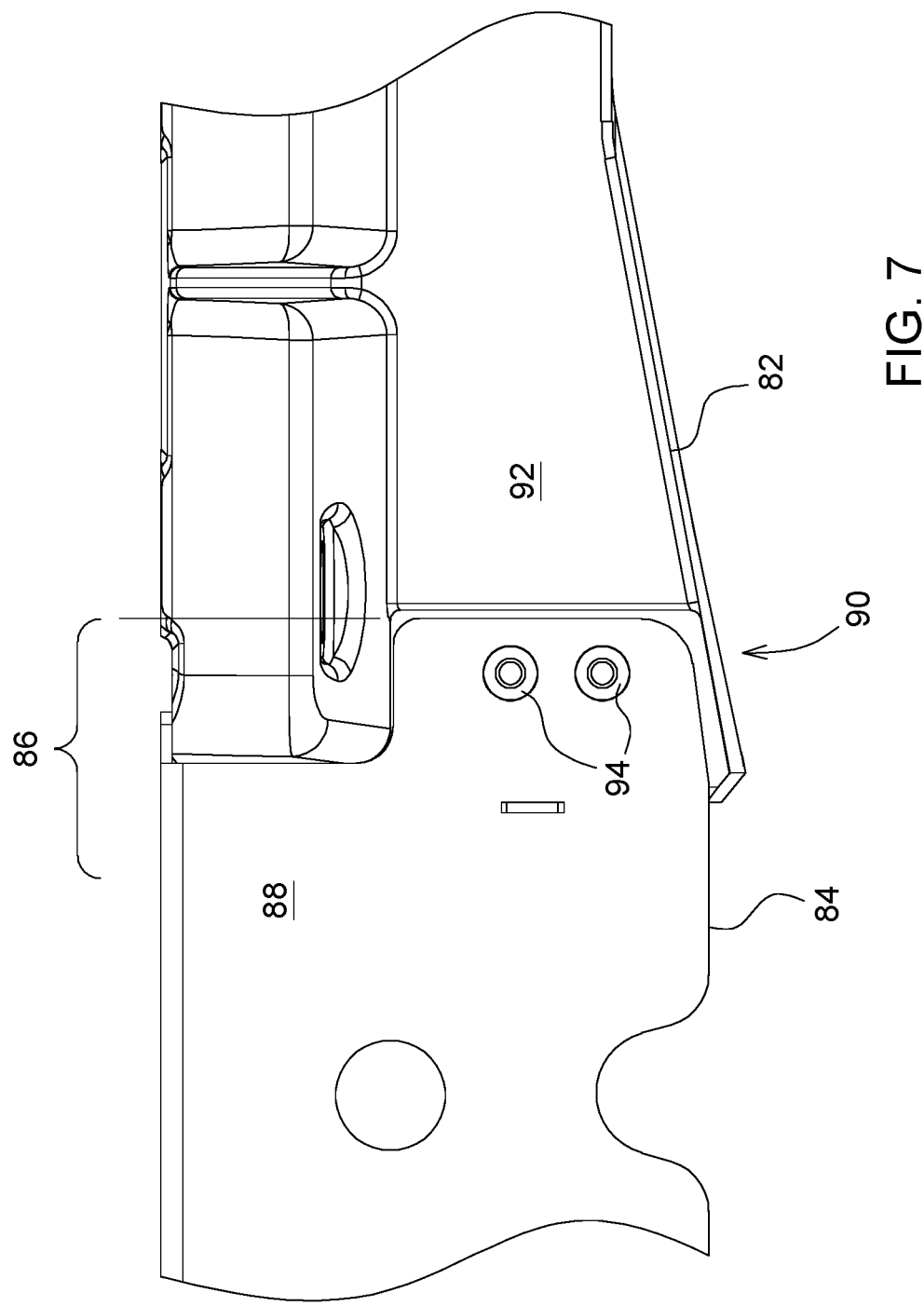
FIG. 7 is a detail view of a joint formed in a beam leg of the frame portion of FIG. 5, according to some implementations of the present disclosure.

The first portion 82 of the first beam leg 78 joins the second portion 84 at a joint 86, as shown in FIG. 5. The first portion 82 and the second portion 84 of the first beam leg 78 may be joined together such as by welding, an adhesive, a fastener, or a combination of two or more of these joining features. FIG. 7 shows the joint 86 along a first side 88 of the first beam leg 78. At the joint 86, the second portion 84 overlaps the first portion 82 at an overlapping portion 90 such that an exterior surface 92 of the first portion 82 abuts an interior surface of the second portion 84. At the overlapping portion 90, the first portion 82 of the first beam leg 78, the second portion 84 of the first beam leg 78, and a stiffener 98 (described in more detail below) are joined by a pair of fasteners 94. For example, the first and second portions 82 and 84 and the stiffener 98 may be joined by one or more blind, oversized, and mechanically interlocking (BOM) fasteners. In some implementations, the BOM fasteners may be in the form of rivets. In other implementations, the fasteners 94 may be bolts or other types of fasteners. Further, although two fasteners 94 are shown, fewer or additional fasteners 94 may be used.

Figure 8:
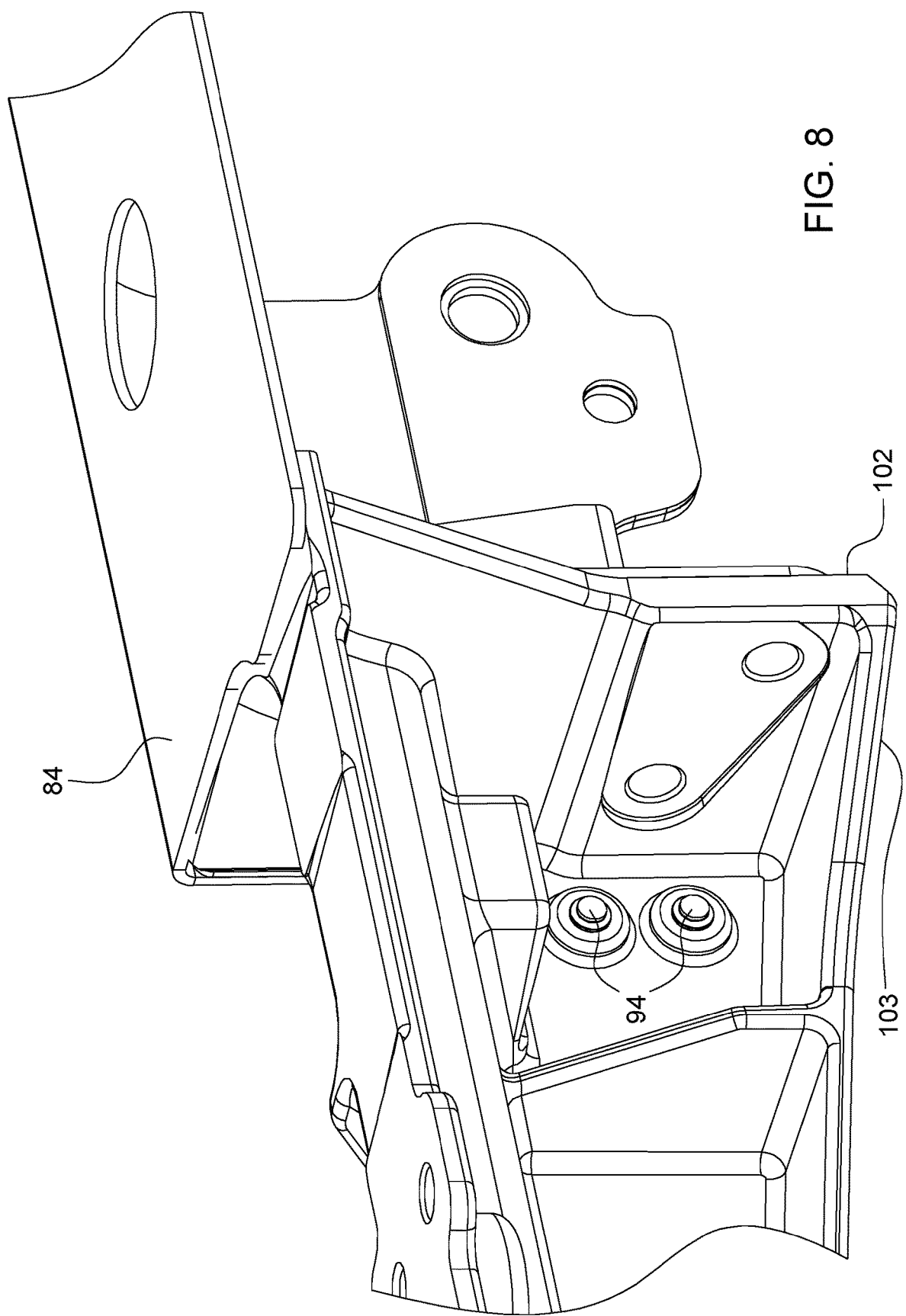
FIGS. 8, 9, and 10 are detail views of the joint formed in a beam leg of the frame portion of FIG. 5, according to some implementations of the present disclosure.
Figure 9:
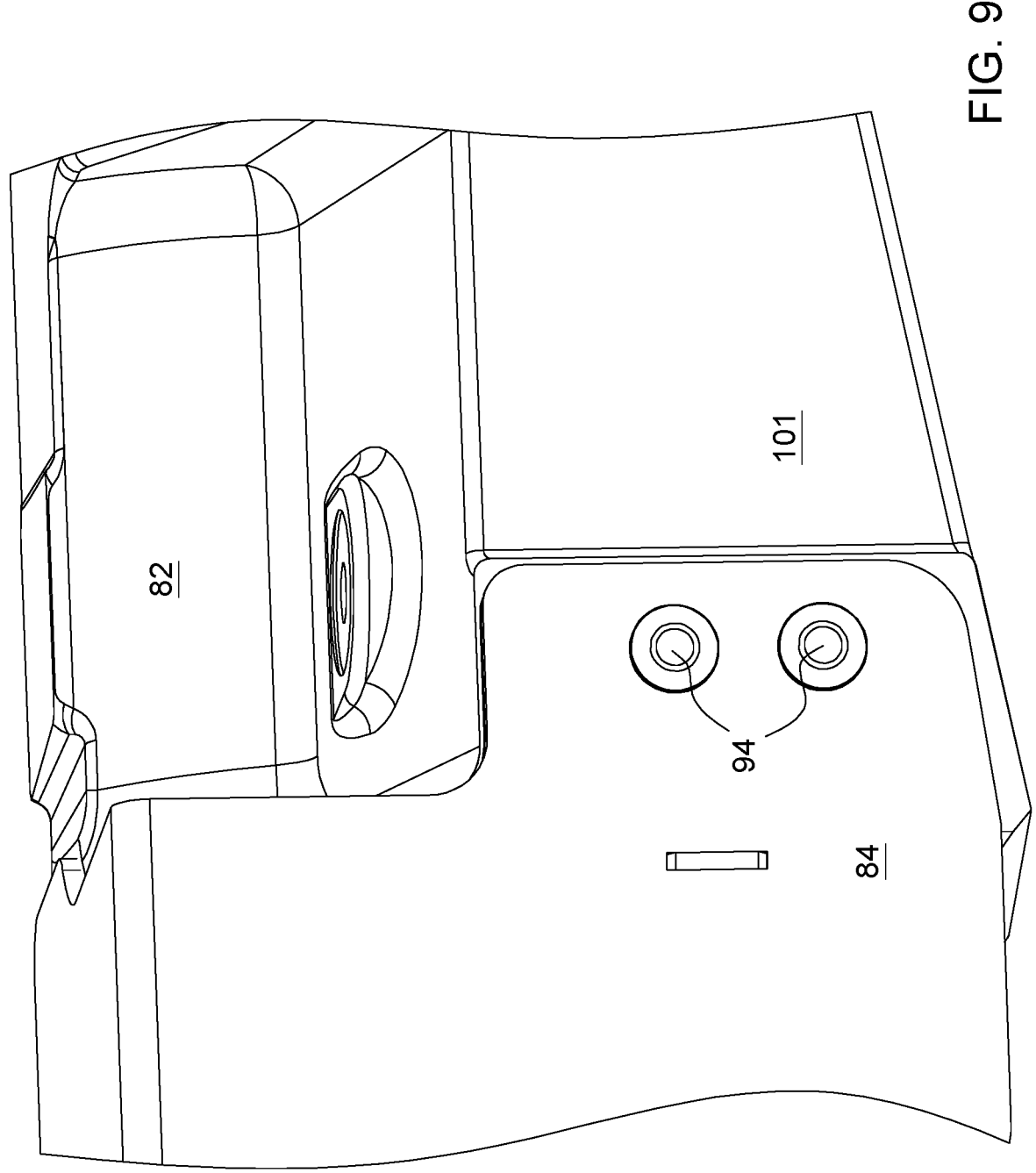
Figure 10:
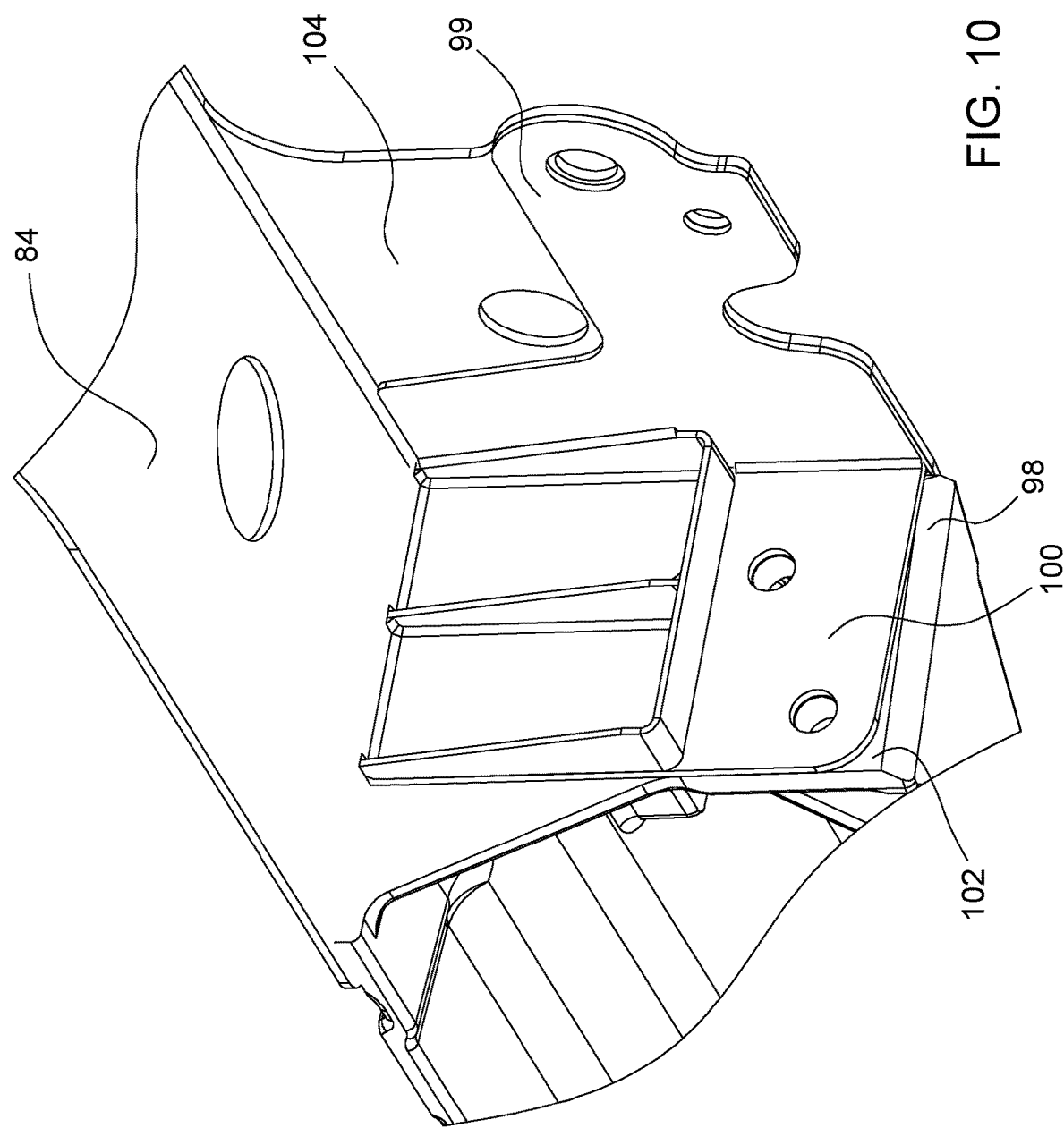

FIGS. 8 and 9 are detail views of the joint 86 showing the fasteners 94 extending through an interior surface 96 of the first portion 82. FIG. 10 is a perspective view of the joint 86 of the first beam leg 78. As shown, the first beam leg 78 also includes the stiffener 98 located between the first portion 82 and the second portion 84 and interconnecting the first and second portion 82 and 84.

Figure 11:
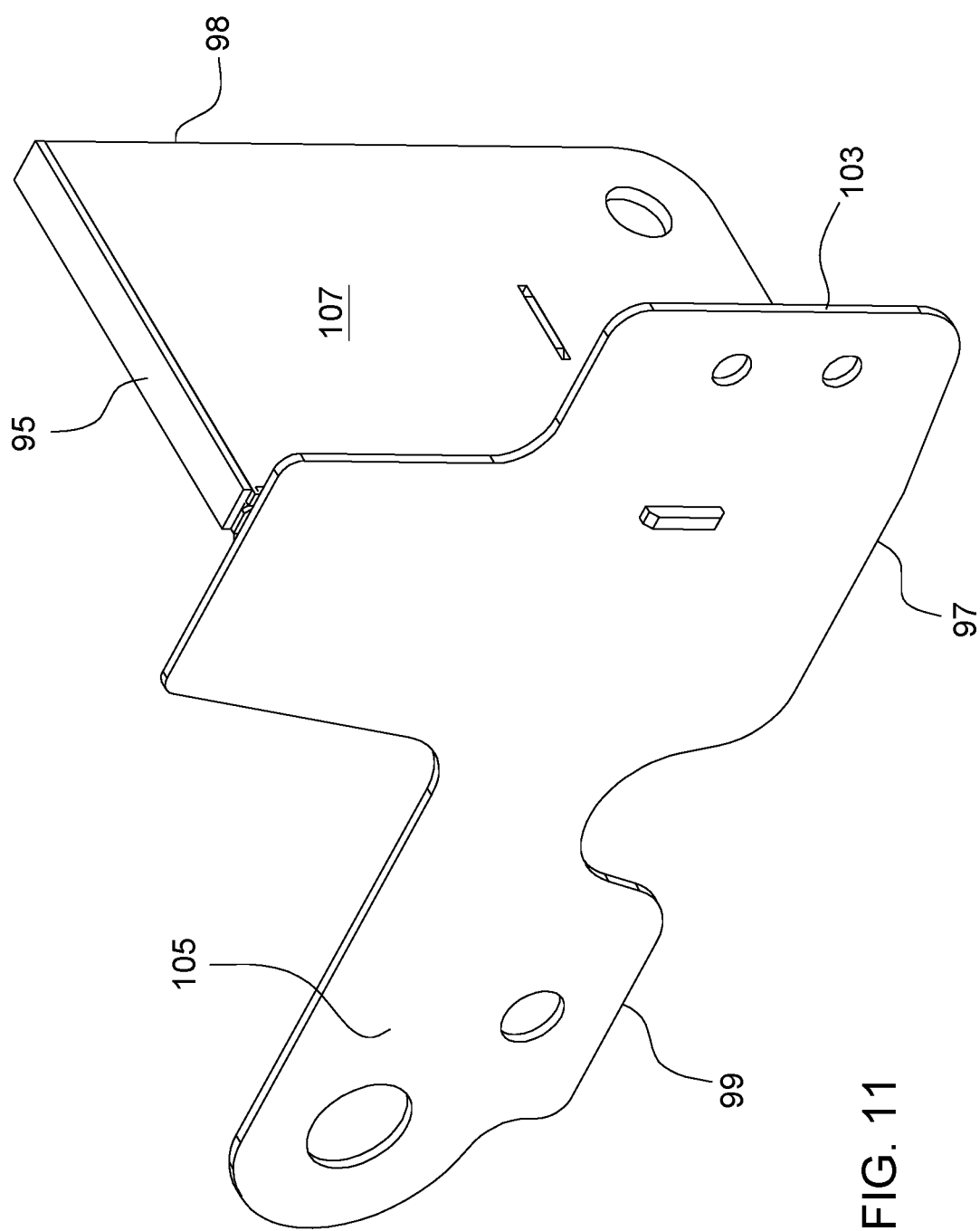
FIG. 11 is a perspective view of a stiffener, according to some implementations of the present disclosure.

FIG. 11 is a perspective view of the stiffener 98. As shown in FIGS. 10 and 11, the stiffener 98 has a general "T" shape and includes a base 95, a first flange 97, and a second flange 99. The first flange 97 and the second flange 99 extend perpendicularly from the base 95. In other implementations, the angle defined between the base 95 and the flanges 97 and 99 may be greater than or less than 90°.

The base 95 abuts a surface 102 of an end 103 of the first portion 82 of the first beam leg 78. The first flange 97 is positioned between the first portion 82 of the first beam leg 78 and the second portion 84 of the first beam leg 78 at the overlapping portion 90. Particularly, an outer surface 101 of the first portion 82 of the first beam leg 78 abuts an interior surface 103 of the first flange 97, and an outer surface 105 of the first flange 97 abuts an interior surface 104 of the second portion 84 of the first beam leg 78. The stiffener 98 is attached to the first and second portions 82 and 84 of the first beam leg 78 with an adhesive. For example, an adhesive may be applied to a surface 107 of the base 95 of the stiffener and the outer surface 101 of the first portion 82; the interior surface 103 of the first flange 97 and the outer surface 101 of the first portion 82; and the outer surface 105 of the first flange 97 and the interior surface 104 of the second portion 84. Additionally, the fasteners 94 extend through each of the stiffener, the first portion 82 and the second portion 84 to secure the stiffener 98 to the first and second portions 82 and 84.

The stiffener 98 is formed from the second material. For example, in some implementations, the stiffener 98 may be formed from steel and coupled to the first and second portions 82 and 84 of the first beam leg 78 formed from aluminum. The arrangement of the first and second portion 82 and 84 and the stiffener 98 increases the rigidity and strength of the first beam leg 78 while, simultaneously, reducing the mass of the first beam leg 78 compared to conventional designs.

Referring again to FIG. 5, the second beam leg 80 is in the form of a casting and is formed from the first material. Conventionally, the first and second beam legs 78 and 80 are formed from a material having an increased density compared to the first material. For example, conventionally, the first and second beam legs 78 and 80 are formed from steel or cast iron, causing an associated frame assembly to have a mass greater than a mass of the frame portion 76 of the present disclosure. A frame portion 76 that includes the construction described herein results in a frame portion 76 having a reduced total mass compared to frame portions of conventional stalk roll assemblies.

Figure 12:
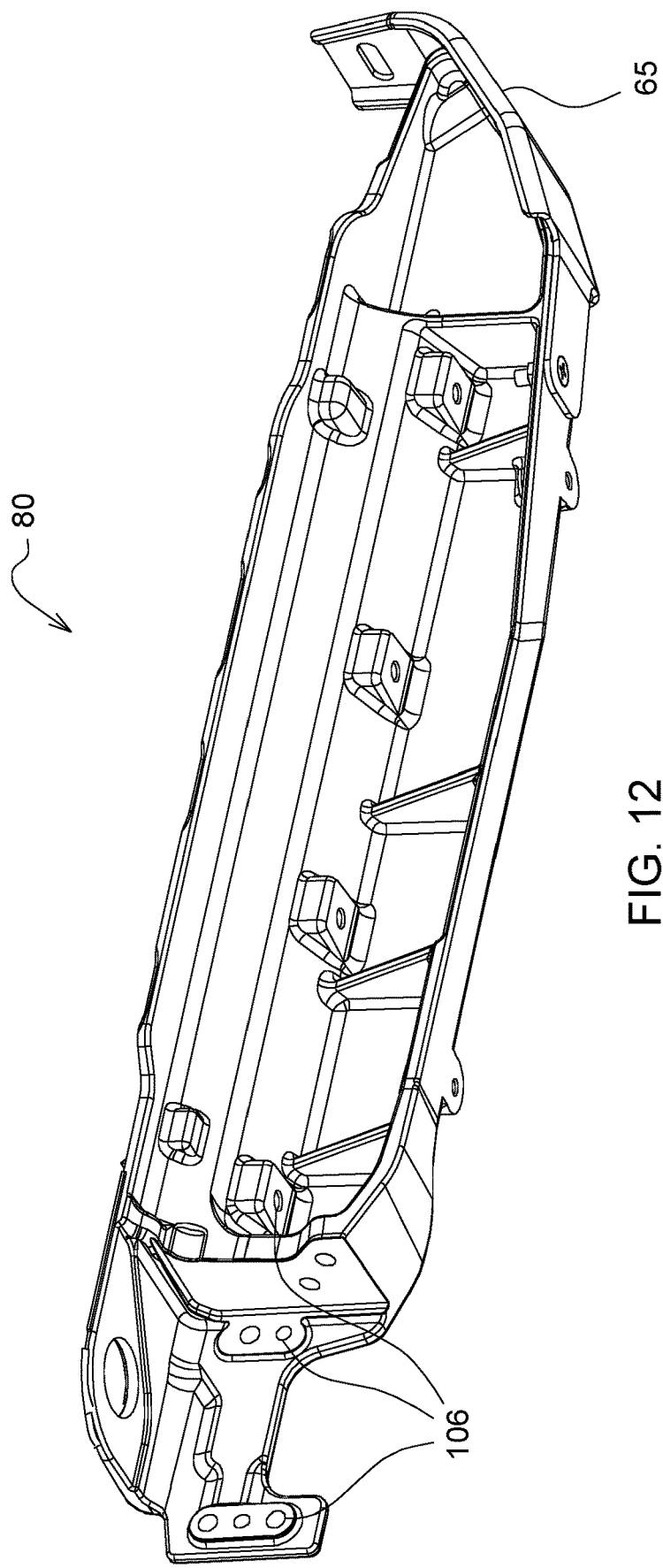
FIG. 12 is a perspective view of an example beam leg, according to some implementations of the present disclosure.

As shown in FIG. 12, the second beam leg 80 is a unitary component having integrated mounting locations 106 adapted to connect one or more other components to the second beam leg 80. In some implementations, the mounting locations 106 are formed into the second beam leg 80 during casting of the second beam leg 80 or are machined into the second beam leg 80 after formation or both. Integrally forming the mounting location 106 into the second beam leg 80 avoids the use of separate brackets to be attached to the second beam leg 80 for use in coupling the other components to the second beam leg 80. Again, by eliminating separate brackets or similar components, the total mass, cost, and complexity of the frame portion 76 is reduced.

Another of the skid plates 63 is coupled to the first end 65 of the second beam leg 80, as shown in FIG. 5. As explained above, the skid plate 63 is formed from the second material, different from the first material, and may be coupled to the second beam leg 80 by, for example, an adhesive, a fastener, or both.

As shown in FIG. 5, the breast plate 81 attaches to the first and second beam legs 78 and 80 at second ends 108 thereof. The breast plate 81 includes a first end portion 110, a second end portion 112, and a central portion 114 connecting the first end portion 110 and the second end portion 112. The first portion 110 couples to the second end 108 of the first beam leg 78, and the second portion 112 couples to the send end 108 of the second beam leg 80.

In some implementations, a thickness of the material forming the breast plate 81 may be, for example, 2.0 mm (0.08 in.), 2.5 mm (0.10 in.), 3.0 mm (0.12 in.), 3.5 mm (0.14 in.), 4.0 mm (0.16 in.), or 4.5 mm (0.18 in.). In other implementations, the thickness of the material forming the breast plate 81 may be less than 2.0 mm or greater than 4.5 mm.

Figure 13:
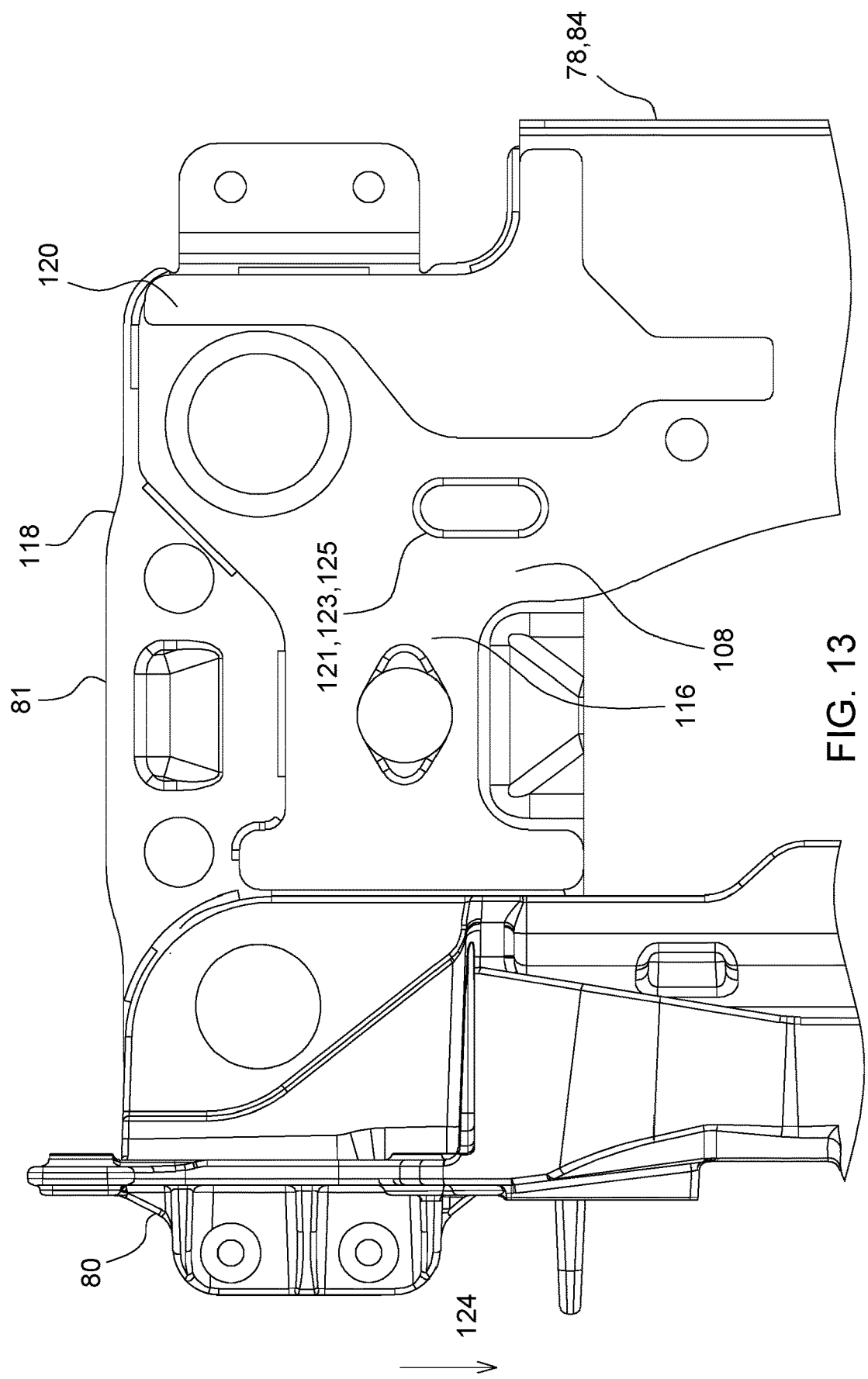
FIG. 13 is a partial detail view of the frame portion of FIG. 5.

FIG. 13 is a detailed bottom view of the frame portion 76 shown in FIG. 5. As shown in FIG. 13, the breast plate 81 overlays and is attached to the second ends 108 of the first and second beam legs 78 and 80. Additionally, the second portion 84 of the first beam leg 78 includes a laterally-extending portion 116, and the laterally-extending portion 116 overlays the central portion 114 of the breast plate 81. Further, the laterally-extending portion 116 abuts a first surface 118 of the breast plate 81. Consequently, the second end of the first beam leg 78 acts as a doubler plate that reinforces and increases rigidity and strength of the breast plate 81.

In some implementations, the first beam leg 78 and the second beam leg 80 are joined to the breast plate 81 by welding. More particularly, the second portions 84 of the first beam leg 78 and the second beam leg 80 may be joined to the breast plate 81 by welding. In other implementations, the first beam leg 78 and the second beam leg 80 may be coupled to the breast plate 81 by an adhesive, one or more fasteners, or a combination an adhesive and one or more fasteners. In still other implementations, one or both of the first beam leg 78 and the second beam leg 80 may be joined to the breast plate 81 with a combination of two or more joining features, such as welding, fasteners, and an adhesive.

FIG. 13 also shows a doubler plate 120 coupled to the second portion 84 of the first beam leg 78 on a side opposite the breast plate 81. Particularly, the doubler plate 120 is coupled to a first surface 122 of the second portion 84 of the first beam leg 78. As shown, the doubler plate 120 extends along the second end 108 of the first beam leg 78 and longitudinally beyond the breast plate 81 in the direction of arrow 124. In some implementations, the doubler plate 120 is formed from the first material. For example, in some implementations, the doubler plate 120 is formed from aluminum, and the doubler plate 120 may be coupled to the first beam leg 78 with an adhesive. An adhesive may be used, for example, when welding would produce a resulting weld having a height that is larger than a thickness of the doubler plate 120 (which could lead to interference with adjacent components) or would risk warping the doubler plate 120. An adhesive bond eliminates these risks while also providing a secure bond between the doubler plate 120 and the second portion 84 of the first beam leg 78.

As also shown in FIG. 13, the second portion 84 of the first beam leg includes an elongated aperture 121. Although the aperture 121 is shown has having an elongated shape, the aperture 121 may have any desired shape. A weld 123 is formed between the second portion 84 of the first beam leg 78 and the breast plate 81 along a perimeter 125 of the aperture 121. Thus, the aperture 121 provides for an increased welded connection between the breast plate 81 and the second portion 84 of the first beam leg 78. Although a single aperture 121 is shown, additional apertures may be included for the formation of a welded connection between the breast plate 81 and the second portion 84 of the first beam leg 78. Still further, in other implementations, the aperture 121 may be omitted.

In other implementations, the doubler plate 120 may be attached to the first beam leg 78 using other joining methods or a combination of joining methods. For example, in some implementations, an adhesive, one or more fasteners, welding, or a combination of two or more of these joining methods may be used. In other implementations, the doubler plate 120 may be formed form the second material. For example, in some implementations, the doubler plate 120 may be formed from steel and may be coupled to the second portion 84 of the first beam leg 78 by, for example, an adhesive, one or more fasteners, or a combination of an adhesive and one or more fasteners.

The breast plate 81, the second portion 84 of the first beam leg 78, and the doubler plate 120 combine to form a three-layered structure having a combined thickness produced by the three different components. This three-layered structure provides increased rigidity and strength to the frame portion 76. Consequently, the arrangement of the first beam leg 78, the second beam leg 80, the breast plate 81 and the doubler plate 120 combine to increase rigidity of the frame portion 76 while reducing an overall mass of the frame portion 76 compared to conventional designs for a stalk roll assembly.

Although the components of the frame portion 76 described in the context of the first configuration and as shown in FIGS. 5 through 13 are illustrated as having particular shapes, the scope of the disclosure is not limited to the example shapes of those components. Rather, the shapes of those components may be varied and remain with within the scope of the present disclosure. Consequently, the illustrated components with the example shapes are not intended to limit the scope of the present disclosure.

Figure 14:
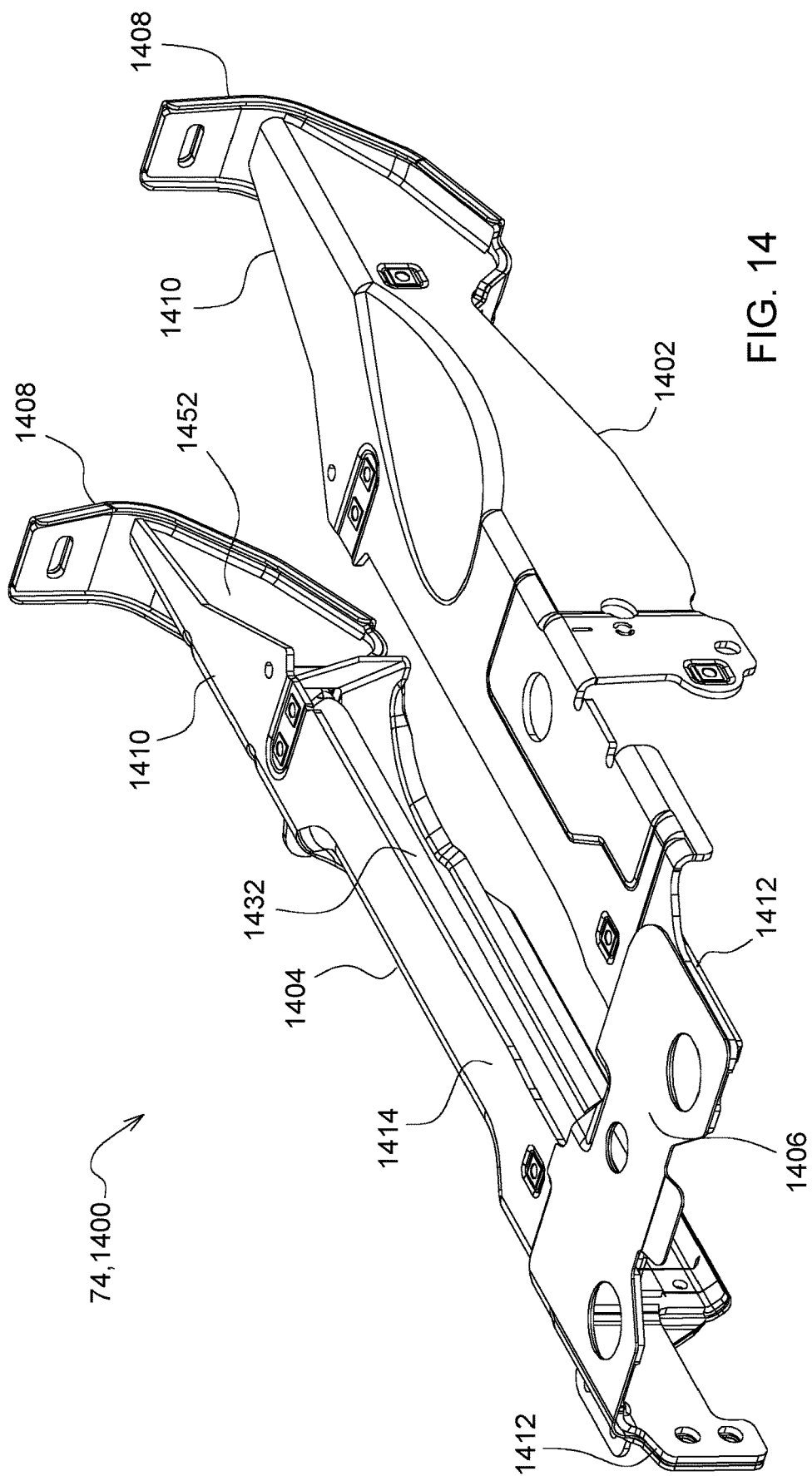
FIG. 14 is a perspective view of another example frame portion, according to some implementations of the present disclosure.

A second configuration of a frame portion within the scope of the present disclosure is shown in the context of FIGS. 14 through 22. FIG. 14 shows another example frame portion 1400 of the stalk roll assembly 36. The frame portion 1400 includes a first beam leg 1402, a second beam leg 1404, and a breast plate 1406 connecting the first and second beam legs 1402 and 1404. A skid plate 1408 is coupled to each of the first beam leg 1402 and second beam leg 1404 at a first end 1410 thereof. The breast plate 1406 is coupled to the first and second beam legs 1402 and 1404 at second ends 1412 thereof. The first beam leg 1402 and the second beam leg 1404 are formed from a first material. The first material may be, for example, aluminum or titanium. For example, in some instances, the first beam leg 1402 and the second beam leg 1404 may be formed from aluminum. The breast plate 1406 is formed from the second material. For example, the breast plate 1406 may be formed from steel. The breast plate 1406 is attached to the first beam leg 1402 and the second beam leg 1404 by an adhesive. Example polymers include those described above.

Figure 15:
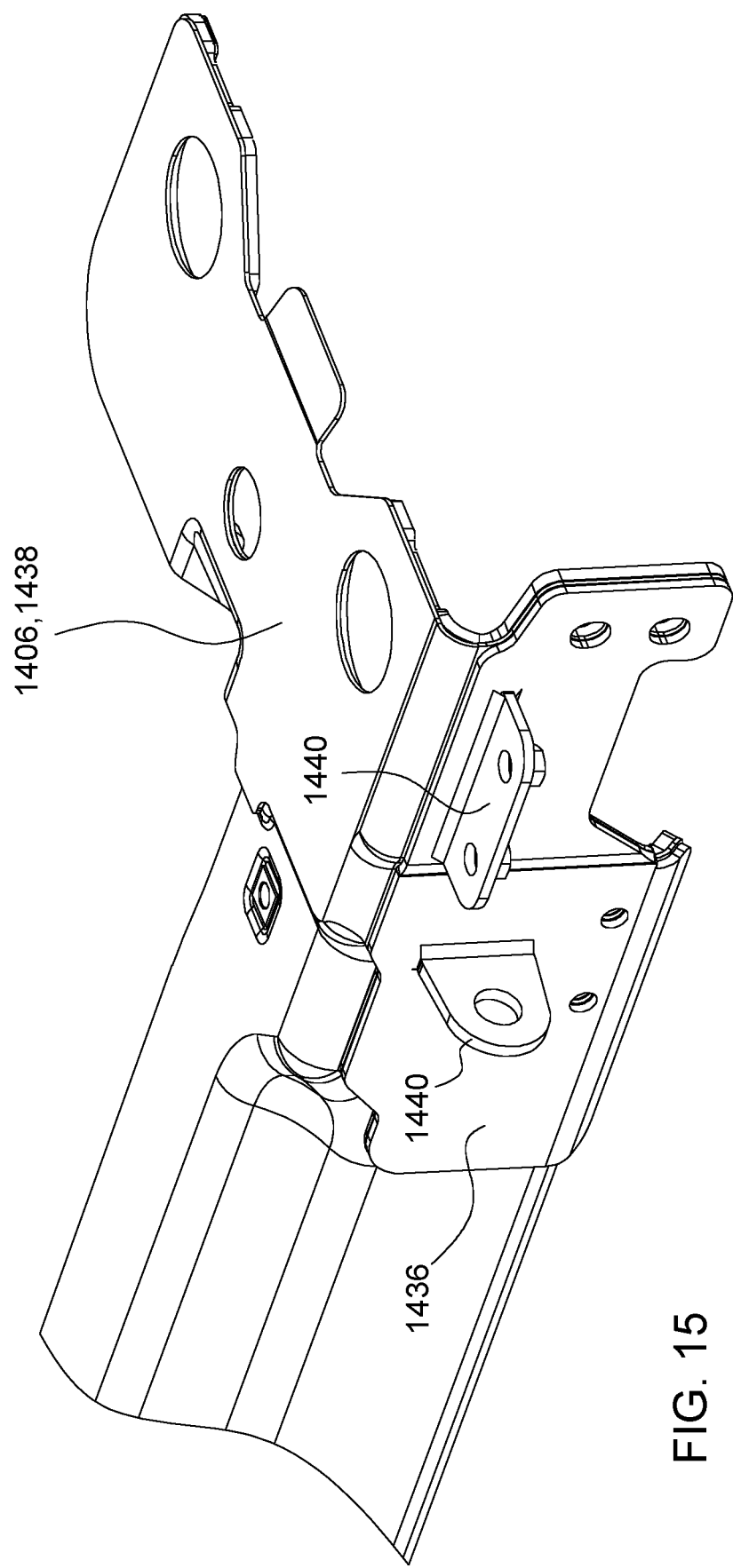
FIG. 15 is a partial detail view of the frame portion of FIG. 14 showing a doubler plate, according to some implementations of the present disclosure.
Figure 16:
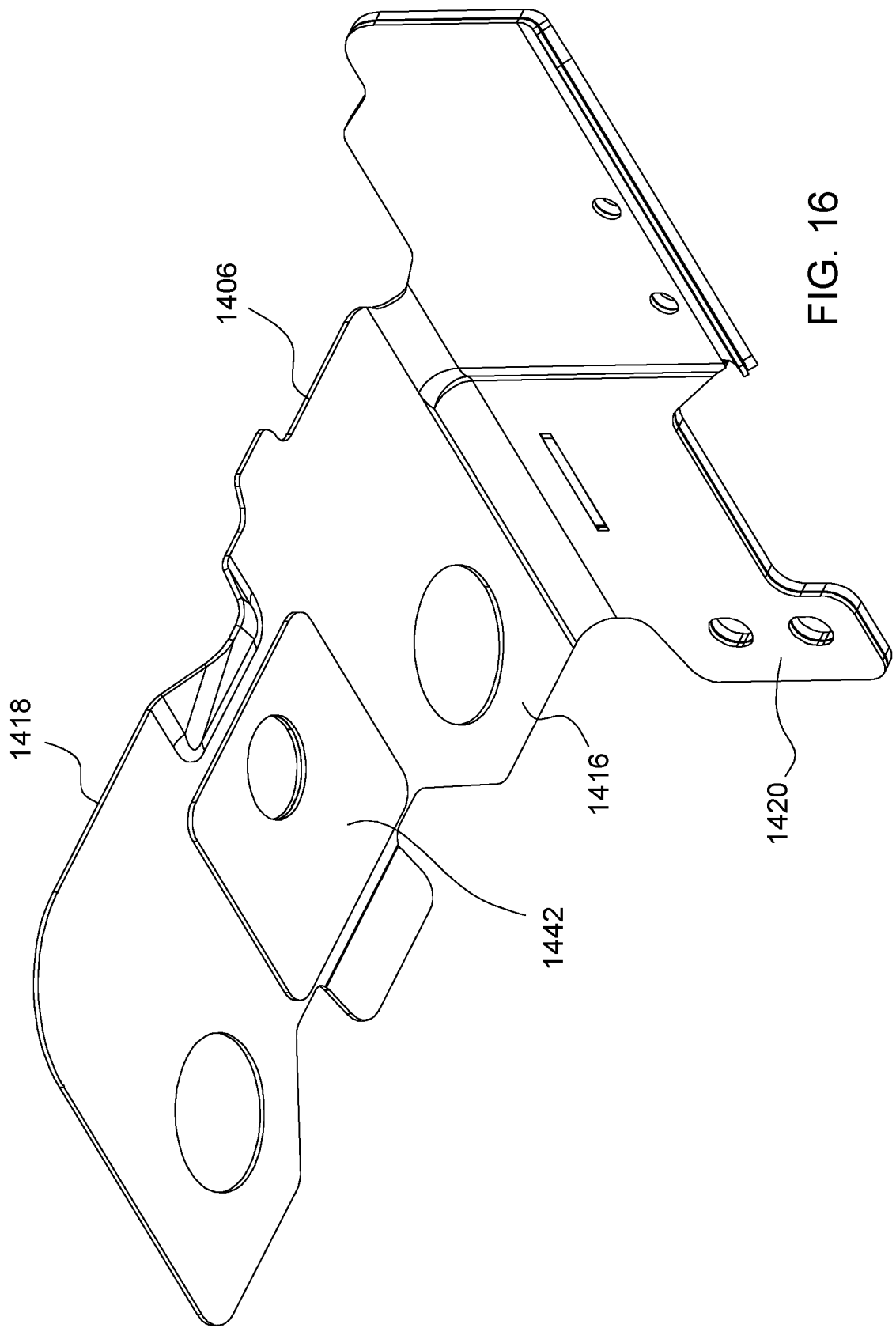
FIGS. 16 and 17 are a perspective views of a breast plate with attached doubler plates of the frame portion of FIG. 14.
Figure 17:
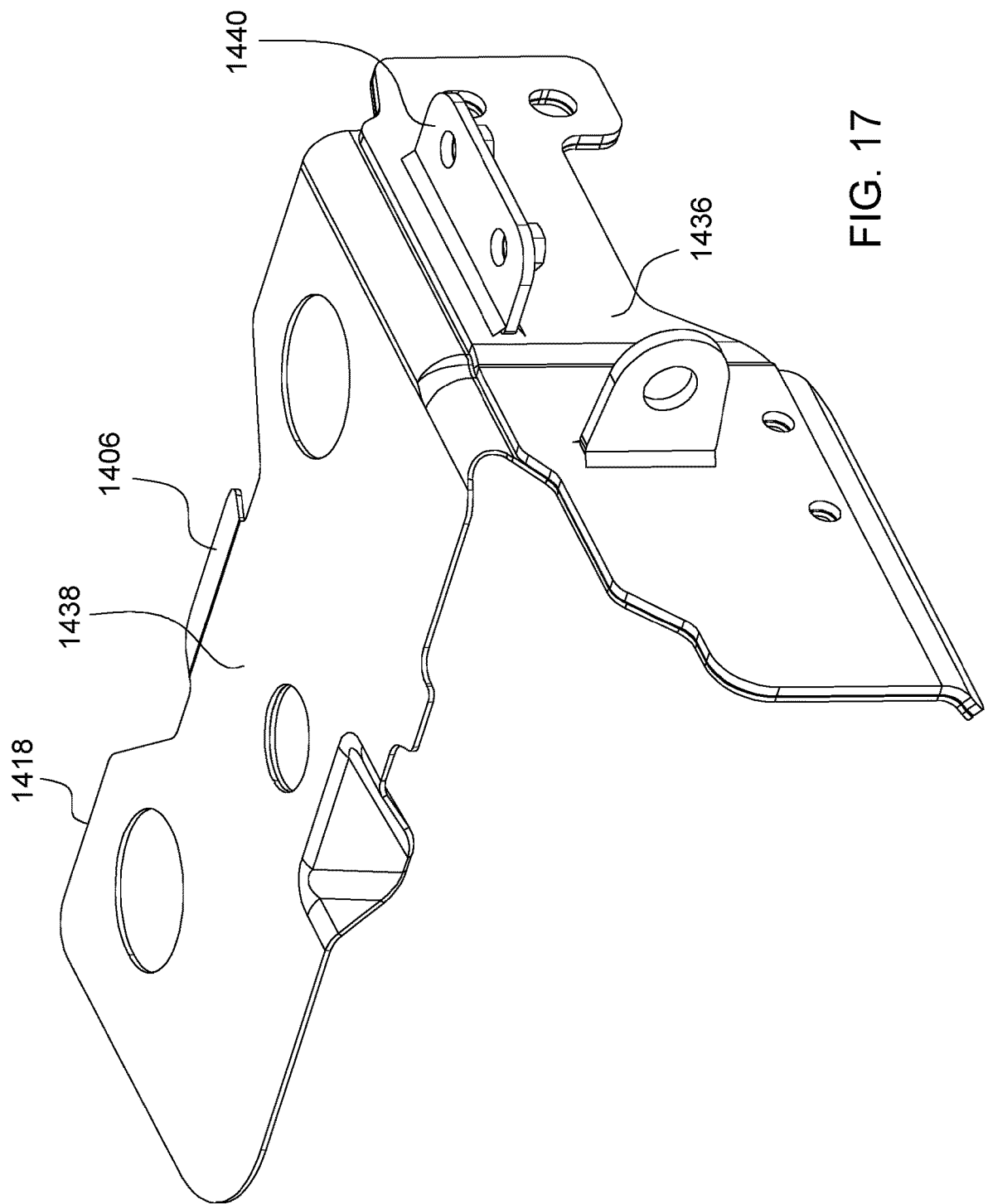

As shown in FIGS. 14 and 15, the breast plate 1406 overlays first surfaces 1414 of the first and second beam legs 1402 and 1404. The first surfaces 1414 may be considered exterior surfaces of the first and second beam legs 1402 and 1404. Thus, the first surfaces 1414 abut a first surface 1416 of the breast plate 1406, shown in FIG. 16. Referring to FIGS. 14, 15, and 16, the breast plate 1406 includes a base portion 1418 and a side portion 1420 that extends orthogonally from the base portion 1418. In other implementations, the base portion 1418 and the side portion 1420 may define an angle that is other than 90°.

Figure 18:
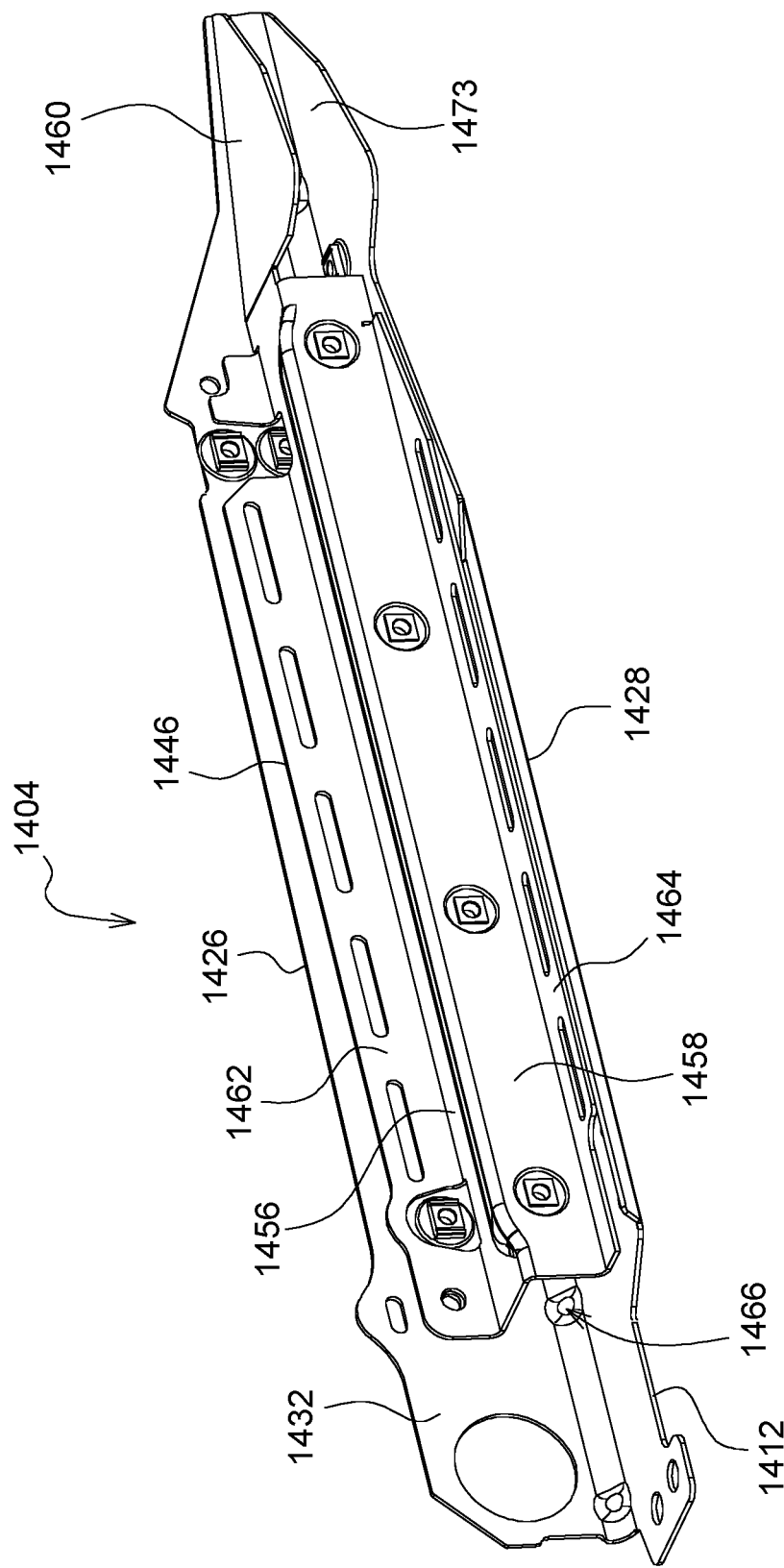
FIGS. 18 and 19 are perspective views of beam legs of the frame portion of FIG. 14.
Figure 19:
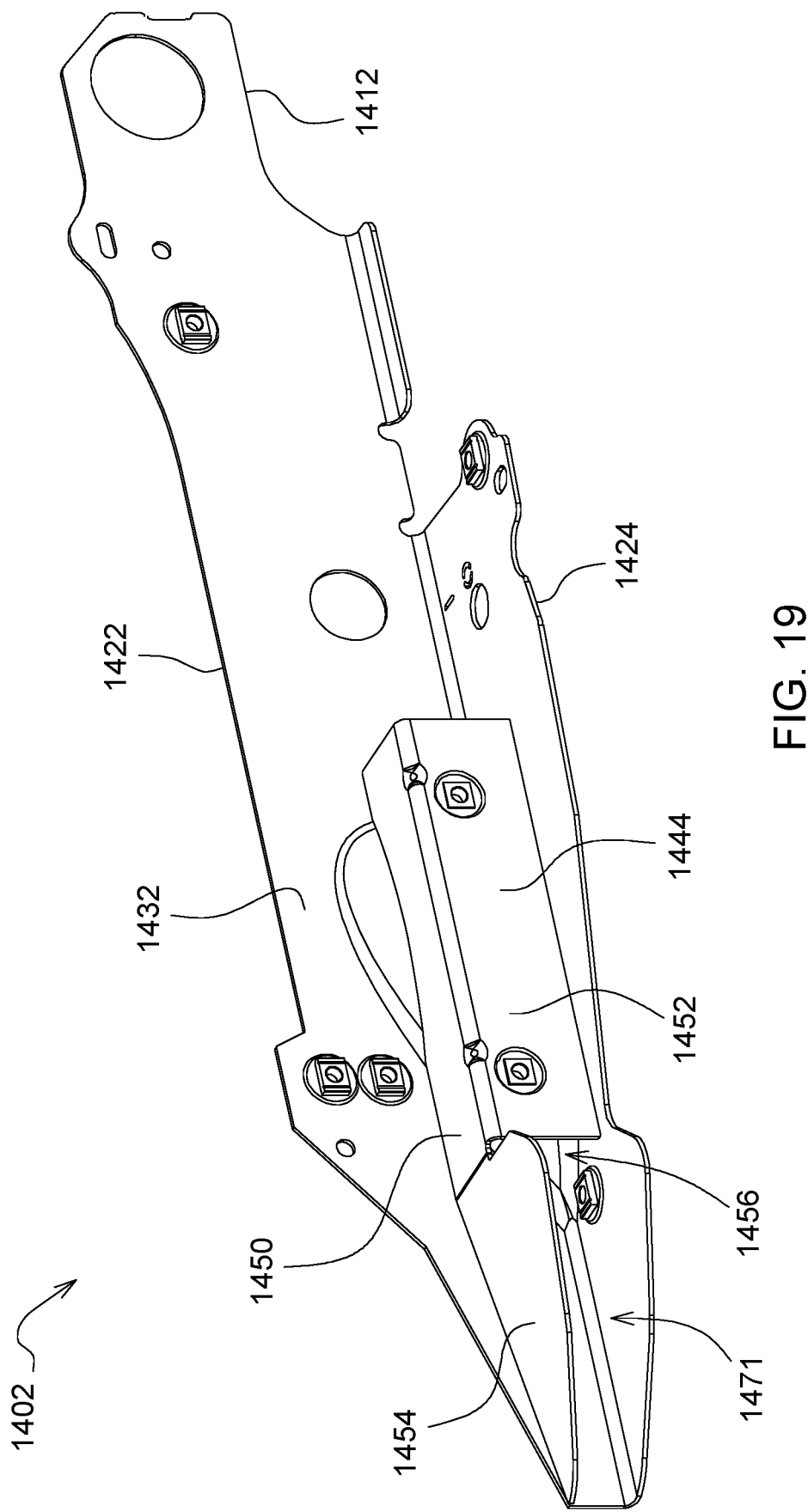

Referring to FIGS. 18 and 19, each of the first beam leg 1402 and the second beam leg 1404 has a general "L"-shaped cross-section. Particularly, the first beam leg 1402 includes a first side portion 1422 and a second side portion 1424 extending orthogonally from the first side portion 1422. In other implementations, the first and second side portions 1422 and 1424 may define an angle that is other than 90°. Similarly, the second beam leg 1404 includes a first side portion 1426 and a second side portion 1428 extending orthogonally from the first side portion 1426. In other implementations, the first and second side portions 1426 and 1428 may have define an angle that is other than 90°.

The side portion 1420 of the breast plate 1406 overlays and abuts the second side portion 1428 of the second beam leg 1404 such that the first surface 1414 of the second beam leg 1404 abuts the first surface 1416 of the breast plate 1406. Additionally, the base portion 1418 of the breast plate 1406 overlays the first side portion 1426 and the first side portion 1422 of the first beam leg 1402 such that the first surfaces 1414 of the first and second beam legs 1402 and 1404 abut the first surface 1416 of the breast plate 1406.

Figure 20:
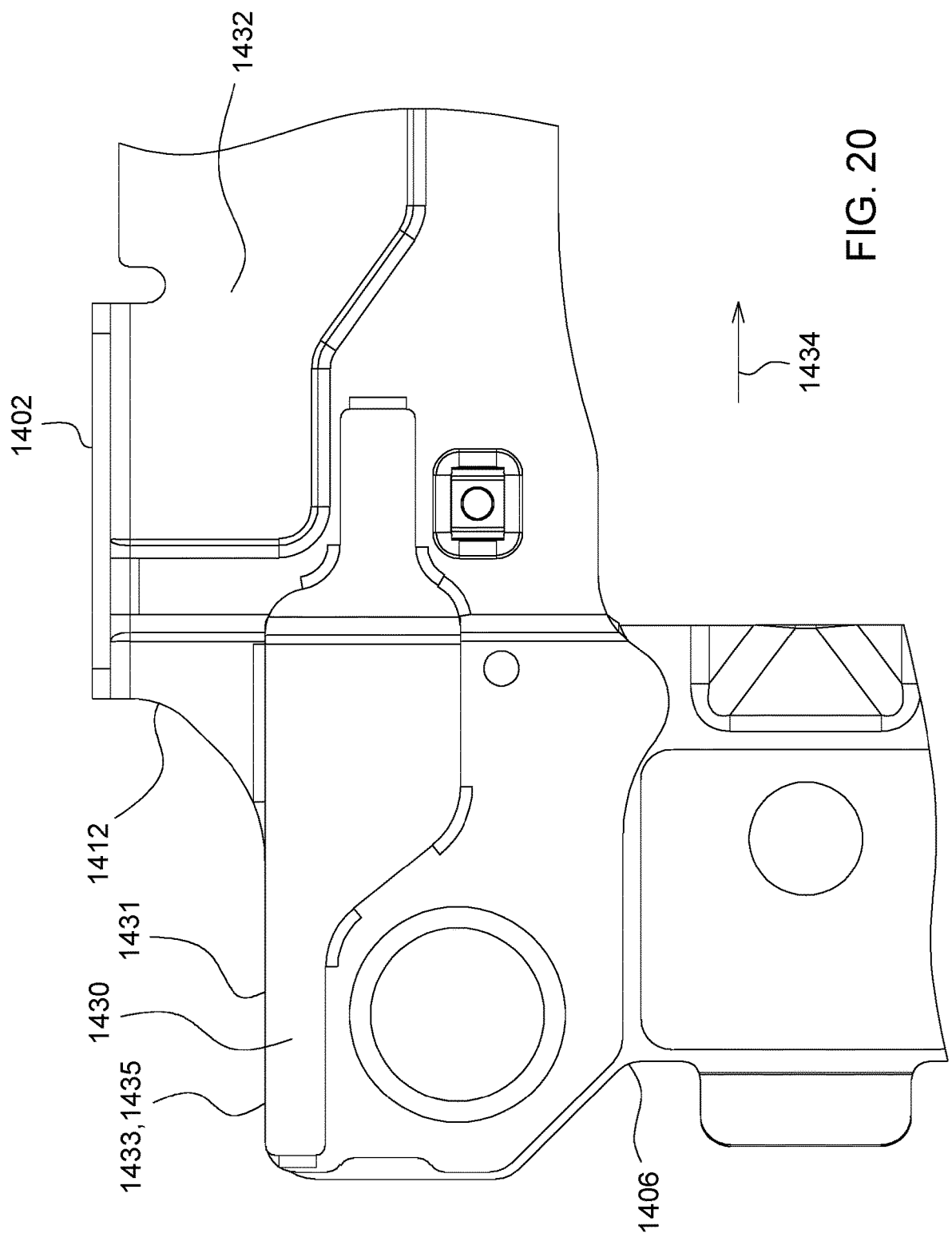
FIG. 20 is a detail view of a portion of the frame portion of FIG. 14.

The frame portion 1400 also includes a doubler plate 1430, as shown in FIG. 20. The doubler plate 1430 is coupled to a second surface 1432 of the first beam leg 1402, opposite the first surface 1414, at the second end 1412 of the first beam leg 1402. As shown, the doubler plate 1430 extends along the first beam leg 1402 longitudinally beyond the breast plate 1406 and in the direction of arrow 1434. Thus, along a portion of the frame portion 1400, the breast plate 1406, the first beam leg 1402, and the doubler plate 1430 overlap each other to provide a three-layered structure that increases rigidity and strength to the frame portion 1400 and, hence, the strength and rigidity of the corn row head 14. Thus, the first beam leg 1402 is sandwiched between the breast plate 1406 and the doubler plate 1430. As also shown, an edge 1431 of the doubler plate 1430 aligns with corresponding edges of the 1433 and 1435 of the first leg beam 1402 and breast plate 1406, respectively. In some implementations, the doubler plate 1430 may be welded to the first beam leg 1402. In other implementations, the doubler plate 1430 may be joined to the first beam leg 1402 using an adhesive. In still other implementations, the doubler plate 1430 may be joined to the first beam leg 1402 using a combination of techniques, such as welding, an adhesive, one or more fasteners, or a combination of two or more of the techniques.

Referring again to FIGS. 15 and 17, a doubler plate 1436 is coupled to a second surface 1438 of the breast plate 1406, opposite the first surface 1416. Particularly, the doubler plate 1436 is coupled to the side portion 1420 of the breast plate 1406. In some implementations, the double plate 1436 is formed form the first material. Particularly, in some implementations, the first material may be formed from aluminum and the breast plate 1406 may be formed from steel. Consequently, the doubler plate 1436 may be coupled to the breast plate 1406 using an adhesive. For example, in some implementations, the doubler plate 1436 may be attached to the breast plate 1406 exclusively using an adhesive. In other implementations, the doubler plate 1436 may be coupled to breast plate 1406 using one or more fasteners or a combination of an adhesive and one or more fasteners.

As explained above, the base portion 1418 of the breast plate 1406 overlays and abuts the first surface 1414 of the first side portion 1426 of the second beam leg 1404. Consequently, the second side portion 1428 of the second beam leg 1404, the side portion 1420 of the breast plate 1406, and the doubler plate 1436 combine to define a three-layered structure of the frame portion 1400. This three-layered structure increases rigidity and strength of the frame portion 1400 and, hence, of the corn row head 14.

The doubler plate 1436 may include mounting features 1440 operable to couple one or more other components to the doubler plate 1436 and, hence, the frame portion 1400. In some implementations, the mounting features 1440 may be integrally formed on the doubler plate 1436 such that the doubler plate 1436 and the mounting features 1440 form an integrally-formed, unitary component. In other implementations, the mounting features 1440 may be separate components that are coupled to the doubler plate 1436. For example, in some implementations, one or more of the mounting features 1440 may be in the form of a bracket that is attached to the doubler plate 1436 such as by welding, an adhesive, a fastener, or a combination of two or more of these.

Also referring to FIG. 16, a doubler plate 1442 is mounted to the first surface 1416 of the breast plate 1406 along the base portion 1418. Particularly, the doubler plate 1442 is located centrally along the base portion 1418 of the breast plate 1406. In some implementations, the doubler plate 1442 is formed from the first material, such as aluminum, and may be attached to the breast plate 1406 by an adhesive. In other implementations, the doubler plate 1442 maybe attached to the breast plate 1406 by both an adhesive and one or more fasteners. Thus, in some implementations, the breast plate 1406 may be formed form steel; the doubler plate 1442 may be formed from aluminum; and the breast plate 1406 and the doubler plate 1442 may be bonded to each other using an adhesive. In other implementations, the doubler plate 1442 may be formed from the first material, such as steel, and may be mounted to breast plate 1406 by, for example, welding, an adhesive, a fastener, or a combination of two or more of these techniques. The doubler plate 1442 is operable to increase rigidity and the strength of the breast plate 1406, the frame portion 1400, and, hence, the corn row head 14.

In some implementations, a thickness of the material forming the first beam leg 1402, the second beam leg 1404, the breast plate 1406, the doubler plate 1436, or the doubler plate 1442 may be the same or different from each other. A thickness of the material forming the first beam leg 1402, the second beam leg 1404, the breast plate 1406, the doubler plate 1436, or the doubler plate 1442 may be, for example, 2.0 mm (0.08 in.), 2.5 mm (0.10 in.), 3.0 mm (0.12 in.), 3.5 mm (0.14 in.), 4.0 mm (0.16 in.), or 4.5 mm (0.18 in.). In other implementations, the thickness of the material forming the first beam leg 1402, the second beam leg 1404, the breast plate 1406, the doubler plate 1436, or the doubler plate 1442 may be less than 2.0 mm or greater than 4.5 mm.

As also shown in FIGS. 18 and 19, a stiffener 1444 is coupled to the first beam leg 1402, and a stiffener 1446 is coupled to the second beam leg 1404. Particularly, the stiffeners 1444 and 1446 are mounted to the first beam leg 1402 and the second beam leg 1404, respectively, along second surfaces 1432 thereof. In some implementations, the stiffeners 1444 and 1446 are formed from the first material. For example, the stiffeners 1444 and 1446 may be formed from aluminum. Thus, in some implantations, the material forming the stiffeners 1444 and 1446 is compatible with the material forming the first and second beam legs 1402 and 1404 such that the stiffeners 1444 and 1446 may be welded to the first and second beam legs 1402 and 1404, respectively.

The stiffener 1444 includes a first side portion 1450, a second side portion 1452 that extends orthogonally from the first side portion 1450, and an end portion 1454 that extends longitudinally from the first side portion 1450. In some implementations, the first side portion 1450 and the second side portion 1452 define an orthogonal angle therebetween. In other implementations, the first side portion 1450 and the second side portion 1452 may define an angle that is other than 90°.

The stiffener 1444 couples to the first beam leg 1402 along the second surface 1432. The stiffener 1450 and the first beam leg 1402 combine to define an elongated cavity 1456 formed between the stiffener 1444 and the first beam leg 1402. In some implementations, the stiffener 1444 is coupled to the first beam leg 1402 by welding, for example. In other implementations, the stiffener 1444 may be attached to the first beam leg 1402 by an adhesive, one or more fasteners, or a combination of these techniques.

The stiffener 1446 includes a first side portion 1456, a second side portion 1458 that extends orthogonally from the first side portion 1444, and an end portion 1460 that extends longitudinally from the first side portion 1456. In other implementations, an angle formed between the first side portion 1456 and the second side portion 1458 may be other than 90°. The first side portion 1456 includes a first flange 1462, and the second side portion 1458 includes a second flange 1464. The stiffener 1446 couples to the second beam leg 1404 at the second surface 1432. Particularly, the first flange 1462 engages the second surface 1432 along the first side portion 1426 of the second beam leg 1404, and the second flange 1464 engages the second surface 1432 along the second side portion 1428 of the second beam leg 1404. The stiffener 1446 and the second beam leg 1404 combine to define an elongated cavity 1466 formed between the stiffener 1446 and the second beam leg 1404. In some implementations, the stiffener 1446 is coupled to the second beam leg 1404 by welding, for example. In other implementations, the stiffener 1446 may be attached to the second beam leg 1404 by an adhesive, one or more fasteners, or a combination of these techniques.

The stiffeners 1444 and 1446 operate to increase rigidity of the first beam leg 1402 and second beam leg 1404, respectively. Consequently, the stiffeners 1444 and 1446 operate to increase a stiffness of the frame portion 1400 and, hence, the corn row head 14. The described construction according to the second configuration also reduces an overall mass of the frame portion 1400 and, hence, the corn row head 14.

Figure 21:
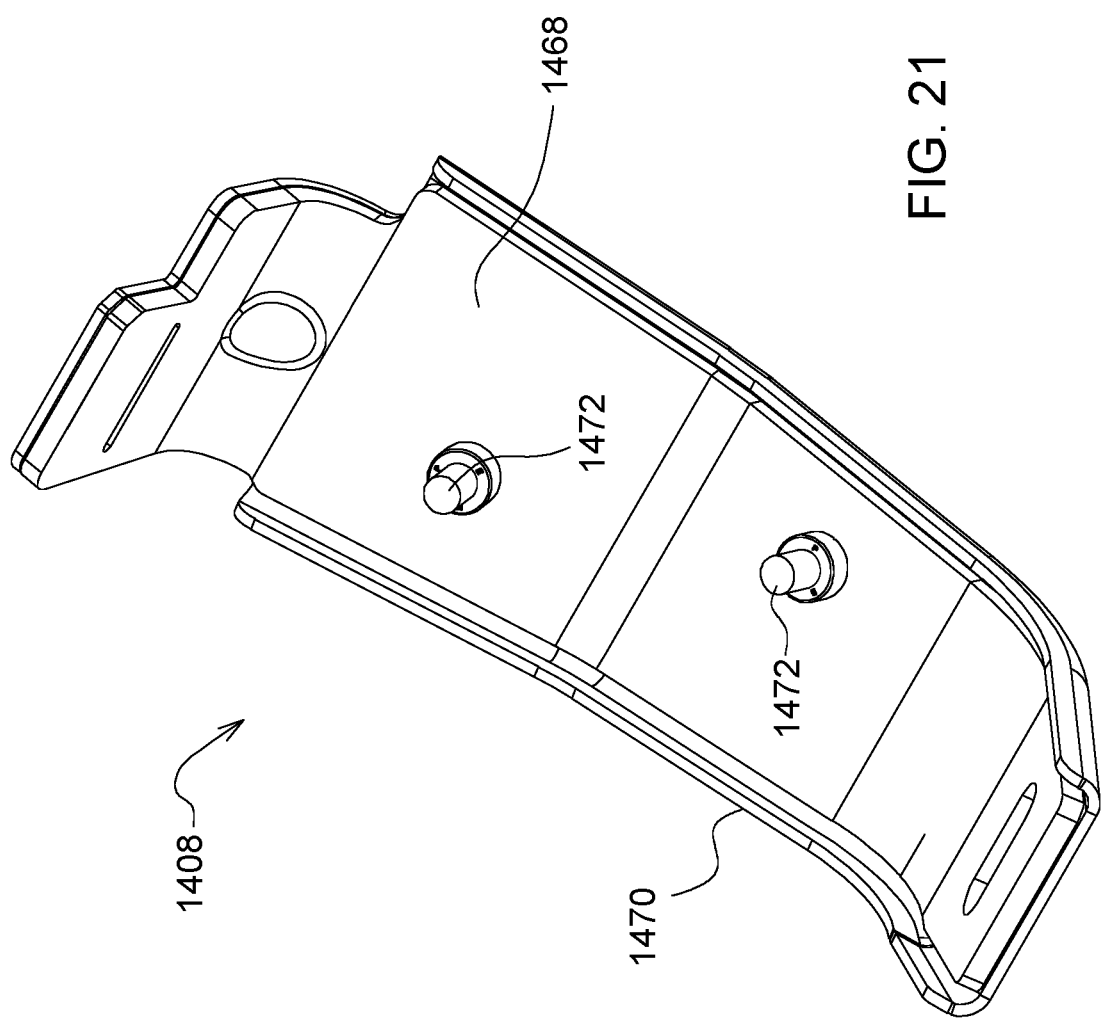
FIG. 21 is a perspective view of an example skid shoe attached to a nose piece, according to some implementations of the present disclosure.
Figure 22:
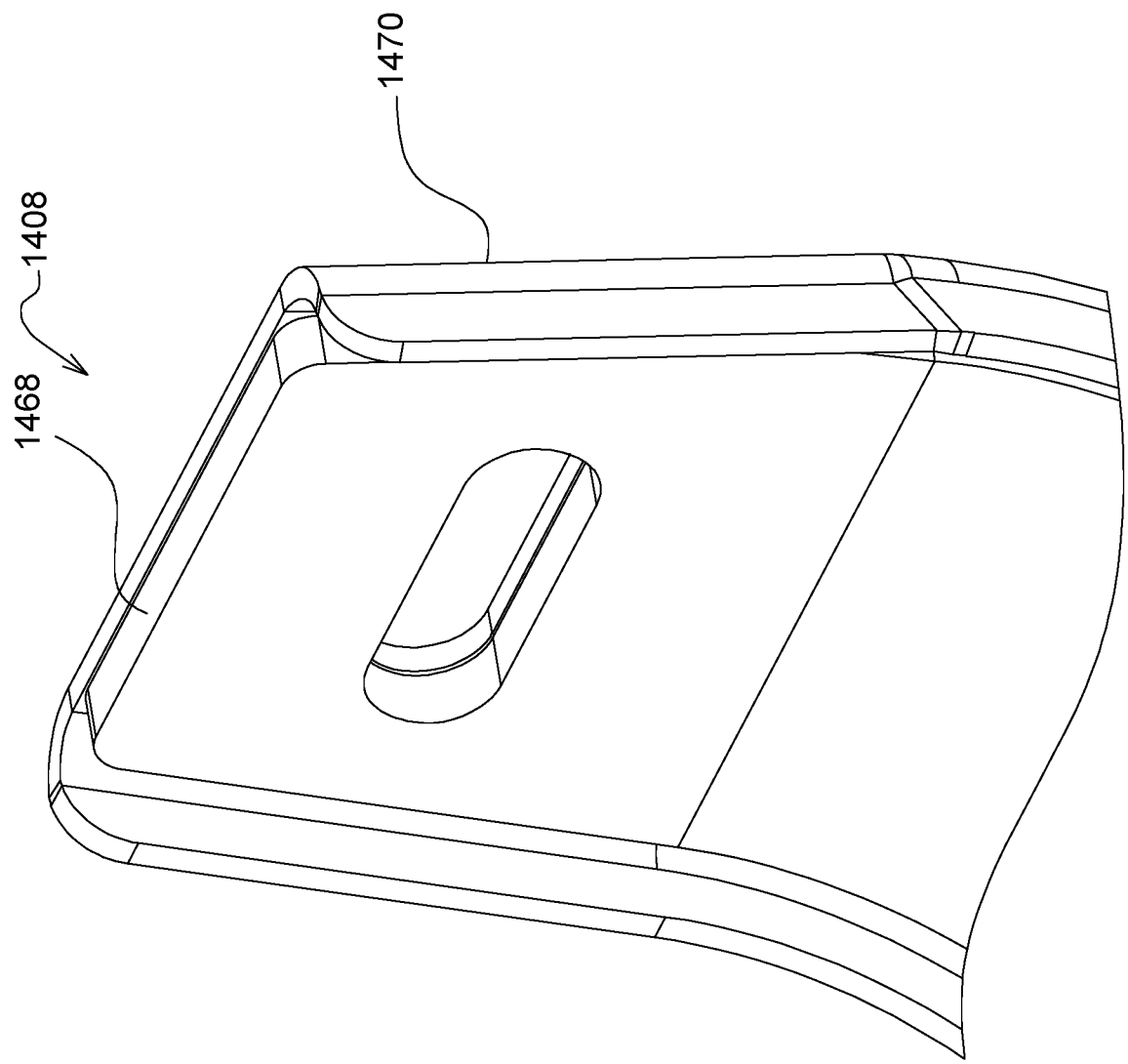
FIG. 22 is a detail view of the skid show of FIG. 21.

FIG. 21 is a perspective view of another example skid plate 1408, and FIG. 22 is a detail view of a portion of the skid plate 1408. An end piece 1468 is shown attached to the skid plate 1408. An end piece 1468 attaches at the first ends 1410 of each of the first and second beam arms 1402 and 1404. The end pieces 1468 are formed from the first material. One of the end pieces 1468 is positioned within a gap 1471 formed between the first beam leg 1402 and the end portion 1454 of the stiffener 1444. Similarly, the other of the end pieces 1468 is positioned within a gap 1473 between the second beam leg 1404 and the end portion 1460 of the stiffener 1446.

In some implementations, the first beam leg 1402, the second beam leg 1404, the stiffener 1444, the stiffener 1446, and the end pieces 1468 are formed from aluminum. Consequently, one of the end piece 1468 may be welded to the first beam arm 1402 and the stiffener 1444, and the other of the end pieces 1468 may be welded to the second beam arm 1404 and the stiffener 1446. Thus, the end pieces 1468 form an end wall at the first ends 1410 of each of the first and second beam legs 1402 and 1404.

The contact plate 1470 is attached to the end piece 1468 by an adhesive and fasteners 1472. Although two fasteners 1472 are illustrated, additional or fewer fasteners 1472 may be used to couple the contact plate 1470 to the end piece

Figure 23:
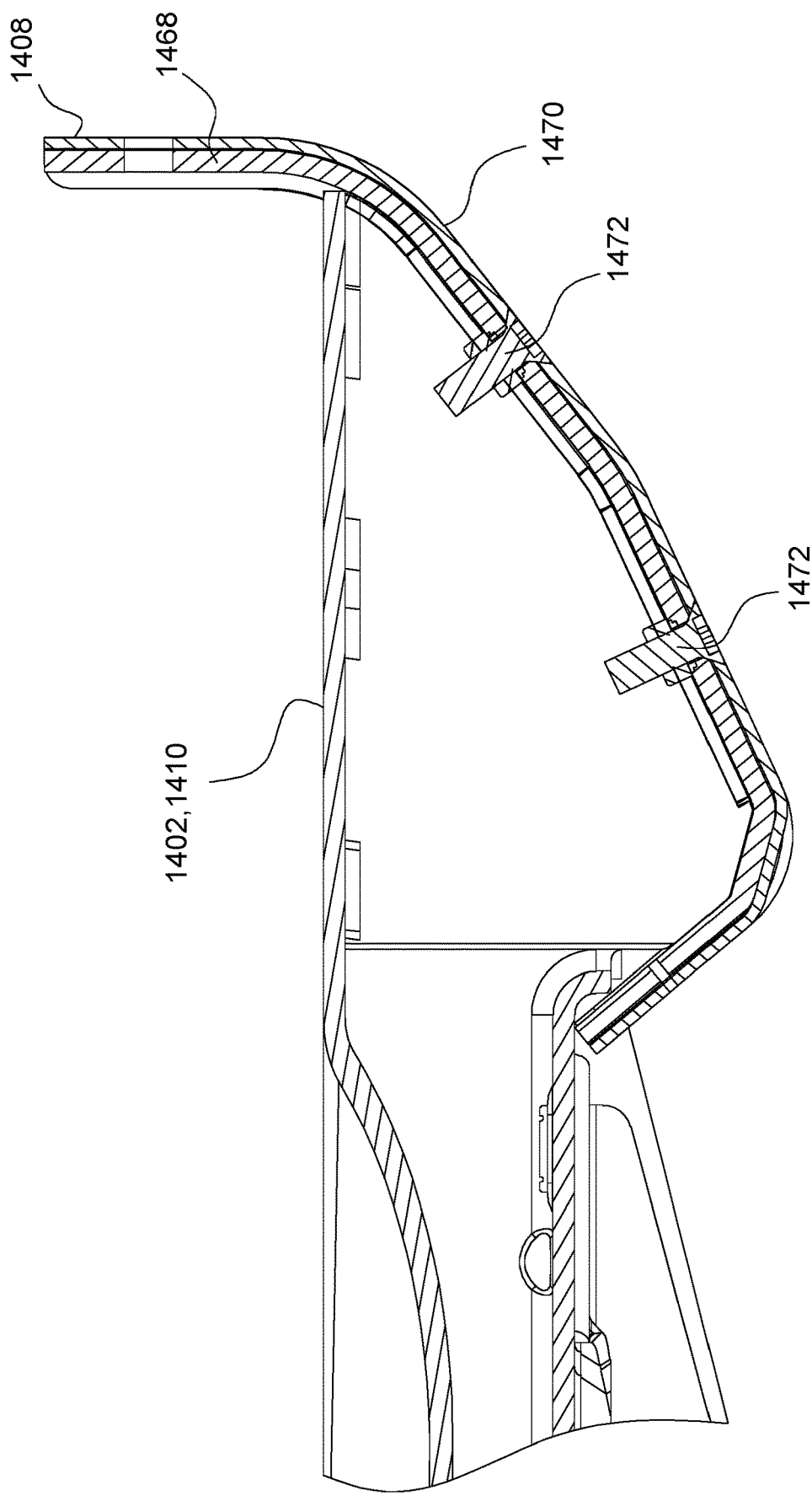
FIG. 23 is a partial cross-sectional view of a beam leg of the frame portion of FIG. 14.

1468. In some implementations, the fasteners 1472 may be omitted, and the contact plate 1470 may be coupled to the end piece 1468 solely using an adhesive. FIG. 23 is a cross-sectional detail view of the first end 1410 of the first beam leg 1402 with the skid plate 1408 attached to the end piece 1468. Fasteners 1472 are shown connecting the contact plate 1470 to the end piece 1468, although, as explained earlier, the fasteners 1472 may be omitted.

In some implementations, one or more fasteners 1472 may be used to hold the contact plate 1470 in position relative to the end piece 1468 and, hence, the remainder of the frame portion 1400. For example, the one or more fasteners 1472 may be used to secure the contact plate 1470 to the end piece 1468 during a period of time to allow an adhesive used to bond the contact plate 1470 to the end piece 1468 to cure. However, in other implementations, the one or more fasteners 1472 may be omitted, and the contact plates 1470 may be coupled to the corresponding end pieces 1468 solely by an adhesive.

Although the components of the frame portion 1400 described in the context of the second configuration and as shown in FIGS. 14 through 22 are illustrated as having particular shapes, the scope of the disclosure is not limited to the example shapes of those components. Rather, the shapes of those components may be varied and remain with within the scope of the present disclosure. Consequently, the illustrated components with the example shapes are not intended to limit the scope of the present disclosure.

Without in any way limiting the scope, interpretation, or application of the claims appearing below, a technical effect of one or more of the example implementations disclosed herein is providing a frame assembly with a reduced mass while maintaining a desired strength. Consequently, an associated head row unit containing the frame assembly has a desired strength while having a reduced overall mass. As a result, a corn row head having frame assemblies as described herein may be made with a greater number of stalk roll assemblies and a resulting increased width of the corn row head, thereby reducing time and energy costs associated with harvesting a given area.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A corn row head comprising:
a stalk roll assembly, the stalk roll assembly comprising:
a frame portion comprising:
a first beam leg including a first end and a second end and formed of a first material;
a second beam leg including a first end and a second end and formed from the first material;
a breast plate coupled to the second ends of the first beam leg and the second beam leg;
a first skid plate coupled to the first end of the first beam leg; and
a second skid plate coupled to the first end of the second beam leg, the first skid plate and the second skid plate formed of a second material different than the first material,
wherein the first material is aluminum, and wherein the second material is steel.

2. The corn row head of claim 1, wherein the first skid plate and the second skid plate are coupled to the first beam leg and the second beam leg, respectively, with an adhesive.

3. The corn row head of claim 1, wherein the first beam leg comprises a first portion and a second portion, and wherein the first portion and the second portion are coupled together with a stiffener formed from the second material.

4. The corn row head of claim 1, wherein the breast plate comprises the second material, and wherein the breast plate is attached to the first beam leg and the second beam leg with an adhesive.

5. The corn row head of claim 4, wherein the first beam leg comprises a laterally-extending portion formed at the second end of the first beam leg, and wherein the laterally extending portion overlaps a central portion of the breast plate.

6. The corn row head of claim 5, further comprising a doubler plate that overlays a portion of the first beam leg at the second end of the first beam leg such that the doubler plate, the breast plate, and the first beam leg form a three-layered structure.

7. The corn row head of claim 1, wherein the breast plate is formed from the second material and comprises a base portion and a side portion angularly extending from the base portion,
wherein the first beam leg comprises a first side portion and a second side portion, the first side portion and the second side portion defining an angle, and
wherein the breast plate overlays the first beam leg such that the side portion of the breast plate overlays an exterior surface of the first side portion of the first beam leg and the base portion of the breast plate overlays an exterior surface of the second side portion of the first beam leg.

8. The corn row head of claim 7, further comprising a doubler plate overlaying the side portion of the breast plate such that the side portion of the breast plate, the first side portion of the first beam leg, and the doubler plate forms a three-layered structure.

9. The corn row head of claim 7, wherein the doubler plate is attached to the side portion of the breast plate with an adhesive and wherein the side portion of the breast plate is attached to the first side portion of the first beam leg with the adhesive.

10. The corn row head of claim 1, wherein the breast plate is formed from the first material, and wherein the first beam leg and the second beam leg are welded to the breast plate.

11. A stalk roll assembly of a corn row head, the stalk roll assembly comprising:
a frame assembly comprising:
a first beam leg formed of a first material;
a second beam leg formed of the first material;
a first skid plate formed of a second material adhesively attached to a first end of the first beam leg; and
a second skid plate formed of the second material adhesively attached to a first end of the second beam leg,
wherein the first beam leg comprises a first casting, the first casting forming an I-beam cross-section at a first end, the I-beam cross-section comprising:
a first flange;
a second flange; and
a web formed between the first flange and the second flange,
wherein the first skid plate is attached to the first flange of the first casing.

12. The stalk roll assembly of claim 11, wherein the first material is aluminum and wherein the second material is steel.

13. The stalk roll assembly of claim 11,
wherein the second beam leg comprises a second casting, the second casting forming an I-beam cross-section at a first end, the I-beam cross-section comprising:
   a first flange;
   a second flange; and
   a web formed between the first flange and the second flange,
wherein the first skid plate is attached to the first flange of the first casting, and
wherein the second skid plate is attached to the first flange of the second casting.

14. The stalk roll assembly of claim 11, wherein the first skid plate and the second skid plate are attached to the first beam leg and the second beam leg, respectively, with one or more fasteners.

15. A method of manufacturing a frame portion of a stalk roll assembly of a corn row head, the method comprising:
   forming a first beam leg from a first material, the first beam leg comprising a first end and a second end;
   forming a second beam leg from a second material, the second beam leg comprising a first end and a second end;
   coupling the first beam leg and the second beam leg;
   attaching a stiffener comprising an end portion to the first beam leg to form a gap between the first beam leg and the end portion of the stiffener;
   positioning an end piece in the gap;
   attaching the end piece to the first leg and the end portion of the stiffener; and
   attaching, with an adhesive, a contact plate to the end piece,
wherein the first material is aluminum and wherein the second material is steel.

16. The method of claim 15, further comprising:
   forming a breast plate from the first material; and
   attaching the breast plate to the second ends of the first beam leg and the second beam leg.

17. The method of claim 16, wherein attaching the breast plate to the second ends of the first beam leg and the second beam leg comprises welding the breast plate to the second ends of the first beam leg and the second beam leg.

18. The method of claim 15, further comprising:
   forming a breast plate from the second material; and
   attaching the breast plate to the second ends of the first beam leg and the second beam leg with an adhesive.

* * * * *